(12) United States Patent
Hodgson

(10) Patent No.: US 11,578,515 B2
(45) Date of Patent: Feb. 14, 2023

(54) VEHICLE INTERIOR COMPONENT

(71) Applicant: Shanghai Yanfeng Jinqiao Automotive Trim Systems Co. Ltd., Novi, MI (US)

(72) Inventor: Thomas Scott Hodgson, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 245 days.

(21) Appl. No.: 17/016,968

(22) Filed: Sep. 10, 2020

(65) Prior Publication Data

US 2020/0408013 A1     Dec. 31, 2020

Related U.S. Application Data

(63) Continuation of application No. PCT/US2019/030556, filed on May 3, 2019.

(Continued)

(51) Int. Cl.
*E05C 3/12* (2006.01)
*B60N 2/75* (2018.01)
(Continued)

(52) U.S. Cl.
CPC .................. *E05C 3/12* (2013.01); *B60N 2/75* (2018.02); *B60R 7/04* (2013.01); *E05C 3/006* (2013.01);
(Continued)

(58) Field of Classification Search
CPC .. E05C 3/12; E05C 3/006; B60N 2/75; B60R 7/04; E05Y 2201/232; E05Y 2201/50; E05Y 2900/538; E05B 77/06; E05B 83/32
(Continued)

(56) References Cited

U.S. PATENT DOCUMENTS

| | | |
|---|---|---|
| 2,873,794 A | 2/1959 | Leslie et al. |
| 4,579,384 A | 4/1986 | Sharod |
| (Continued) | | |

FOREIGN PATENT DOCUMENTS

| | | |
|---|---|---|
| DE | 4130847 C2 | 4/1995 |
| DE | 20311467 U1 | 10/2003 |
| (Continued) | | |

OTHER PUBLICATIONS

International Search Report and Written Opinion from the International Searching Authority for International Patent Application No. PCT/US2019/030556 dated Jul. 29, 2019 (in English) (12 Pages).

*Primary Examiner* — D Glenn Dayoan
*Assistant Examiner* — E Turner Hicks

(57) ABSTRACT

A vehicle interior component configured to be actuated by an inertia force is disclosed. The component may comprise a cover moveable relative to a base between closed and open positions and a latch mechanism to provide a latched state for the cover when actuated by the inertia force and to hold the cover in an unlatched state. The latch mechanism may be configured to change state of the cover from the unlatched state to the latched state when actuated by the inertia force. The cover may comprise the latch mechanism. The latch mechanism may extend from the cover in the latched state. The latch mechanism may form a generally continuous surface with a wall of the cover when unlatched. The latch mechanism may comprise a spring to hold the cover in the unlatched state. The component may comprise at least one of a console; center console; floor console; an armrest.

20 Claims, 10 Drawing Sheets

Related U.S. Application Data

(60) Provisional application No. 62/666,836, filed on May 4, 2018.

(51) Int. Cl.
*B60R 7/04* (2006.01)
*E05C 3/00* (2006.01)

(52) U.S. Cl.
CPC ..... *E05Y 2201/232* (2013.01); *E05Y 2201/50* (2013.01); *E05Y 2900/538* (2013.01)

(58) Field of Classification Search
USPC ............................ 296/37.8, 24.34, 37.1, 1.09
See application file for complete search history.

(56) References Cited

U.S. PATENT DOCUMENTS

| | | | |
|---|---|---|---|
| 4,865,368 A * | 9/1989 | McCall | E05B 65/5292 150/101 |
| 5,116,099 A | 5/1992 | Kwasnik et al. | |
| 6,616,206 B2 | 9/2003 | Luginbill et al. | |
| 6,736,438 B1 | 5/2004 | Wieclawski | |
| 6,802,550 B1 * | 10/2004 | Griggs, Jr. | E05B 83/32 292/136 |
| 7,581,774 B2 | 9/2009 | Abro et al. | |
| 7,607,727 B2 * | 10/2009 | Park | E05B 77/04 292/231 |
| 7,614,674 B2 | 11/2009 | Shiono et al. | |
| 7,845,701 B2 | 12/2010 | Müller | |
| 8,104,817 B2 | 1/2012 | Kayser et al. | |
| 8,191,953 B2 * | 6/2012 | Simon | E05B 77/06 296/1.04 |
| 9,637,060 B2 | 5/2017 | Gaudig | |
| 9,714,530 B2 | 7/2017 | Amick et al. | |
| 9,714,531 B2 | 7/2017 | Vigneau et al. | |
| 10,112,510 B2 * | 10/2018 | Purves | B60N 3/102 |
| 10,518,711 B2 * | 12/2019 | Bokulic | E05B 83/32 |
| 10,717,390 B2 | 7/2020 | Anderson et al. | |
| 10,737,628 B2 | 8/2020 | Anderson et al. | |
| 10,836,280 B2 * | 11/2020 | Hamdoon | B60N 3/004 |
| 2004/0201238 A1 | 10/2004 | Griggs, Jr. et al. | |
| 2008/0111381 A1 * | 5/2008 | Merideth | E05B 77/06 292/137 |
| 2008/0129101 A1 * | 6/2008 | Park | B60N 2/793 70/237 |
| 2012/0001447 A1 | 1/2012 | Simon et al. | |
| 2013/0106121 A1 | 5/2013 | Hasegawa | |
| 2014/0003864 A1 * | 1/2014 | Gillis | B60N 2/4214 403/327 |
| 2017/0145720 A1 | 5/2017 | Roychoudhury | |
| 2017/0267134 A1 | 9/2017 | Anderson et al. | |
| 2018/0009387 A1 * | 1/2018 | Kwon | B60R 7/04 |
| 2020/0207277 A1 | 7/2020 | Anderson et al. | |

FOREIGN PATENT DOCUMENTS

| | | |
|---|---|---|
| DE | 20221460 U1 | 2/2006 |
| DE | 10009291 B4 | 6/2006 |
| DE | 102008030387 A1 | 1/2009 |
| DE | 102010023731 A1 | 12/2011 |
| DE | 102008000802 B4 | 5/2012 |
| DE | 102011053395 A1 | 3/2013 |
| DE | 102014103792 A1 | 9/2015 |
| DE | 202016105434 U1 | 12/2016 |
| DE | 102015104722 B4 | 5/2017 |
| DE | 102016200052 A1 | 7/2017 |
| DE | 202017104655 U1 | 9/2017 |
| DE | 102017111240 A1 | 12/2017 |
| DE | 102017111259 A1 | 12/2017 |
| DE | 102016214520 A1 | 2/2018 |
| DE | 102014009465 B4 | 2/2019 |
| DE | 102018205916 A1 | 10/2019 |
| EP | 0525811 | 2/1993 |
| EP | 1660743 B1 | 2/2007 |
| EP | 1926633 B1 | 9/2009 |
| EP | 2798137 A1 | 11/2014 |
| WO | 2009115347 A1 | 9/2009 |
| WO | 2018024722 A1 | 2/2018 |

* cited by examiner

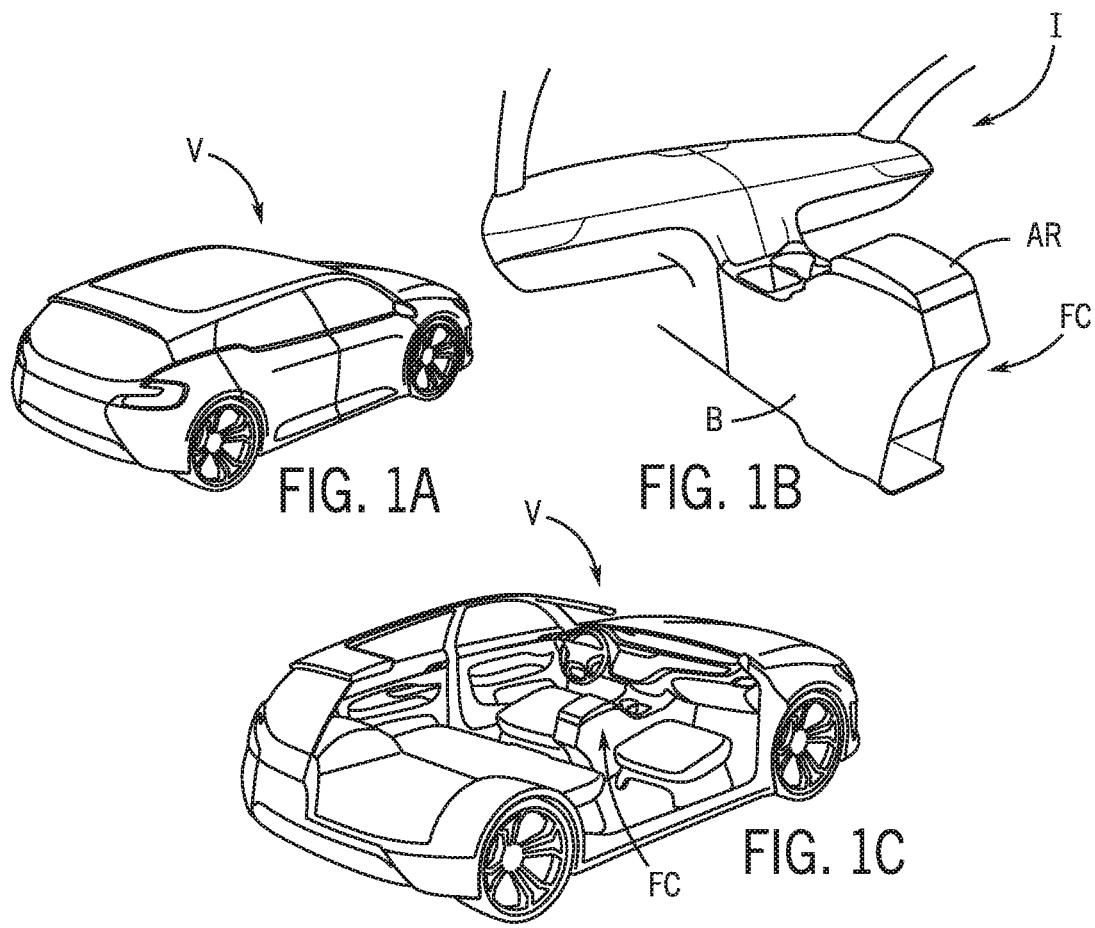
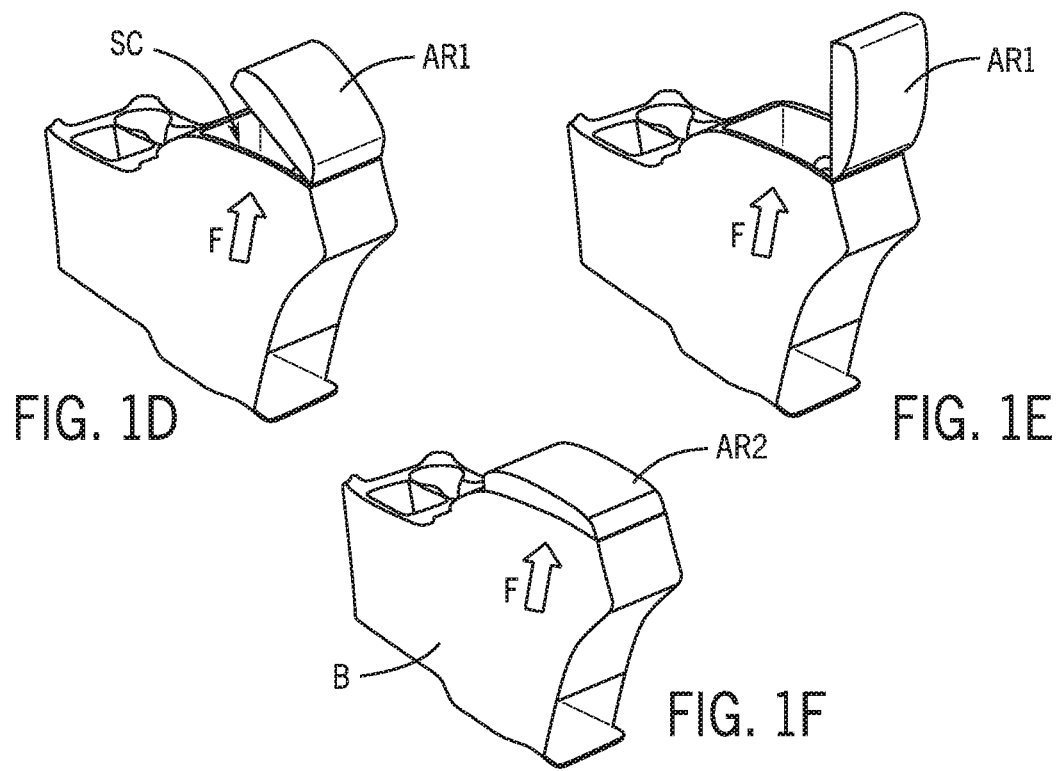

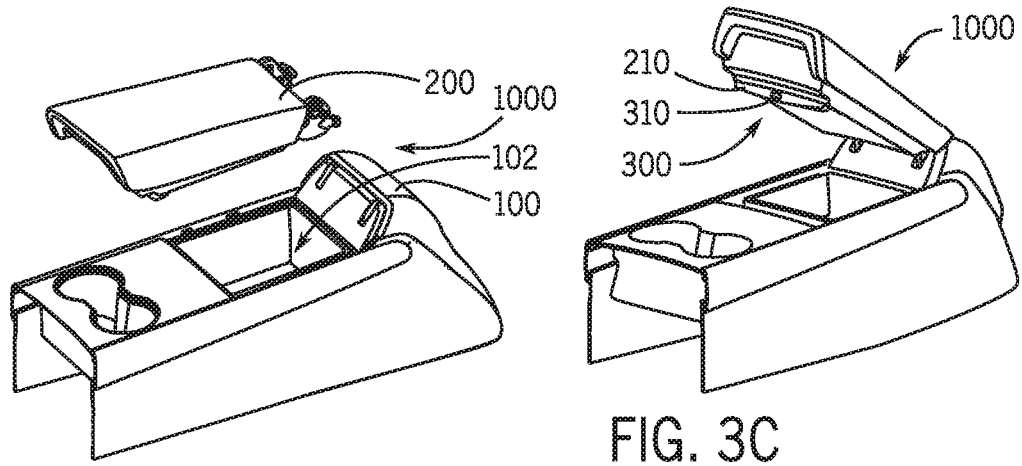
FIG. 3A
FIG. 3C
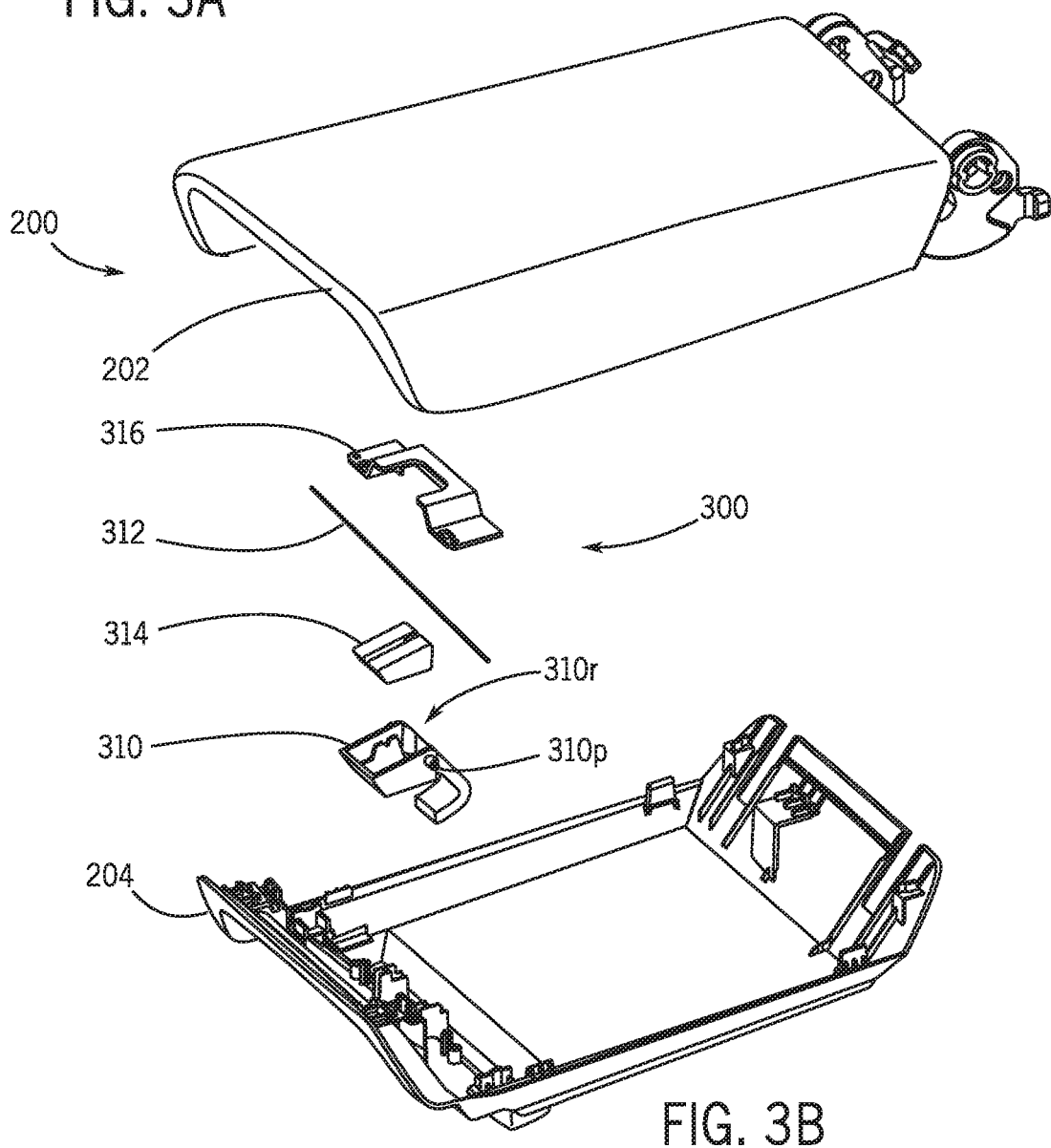
FIG. 3B

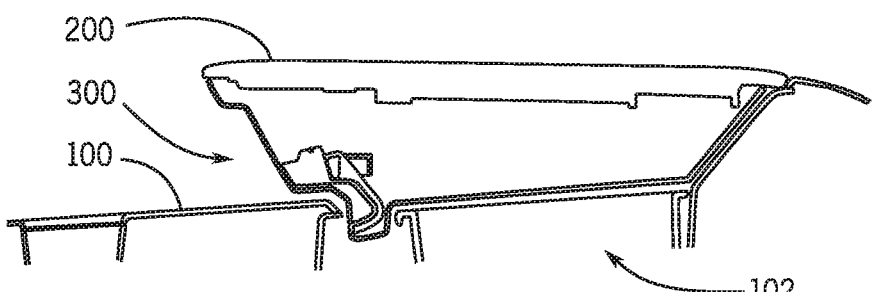
FIG. 4A
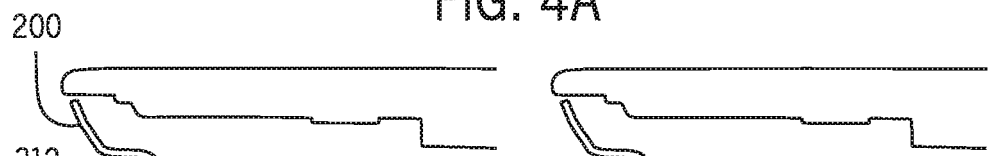
FIG. 4B   FIG. 4C
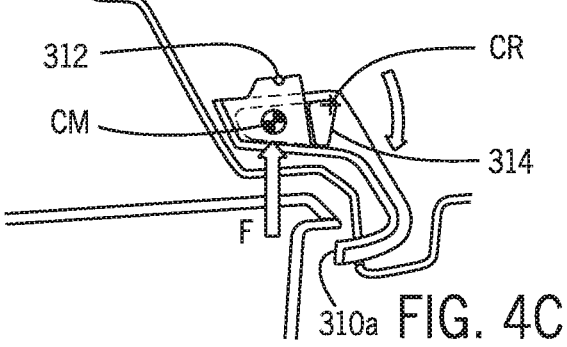
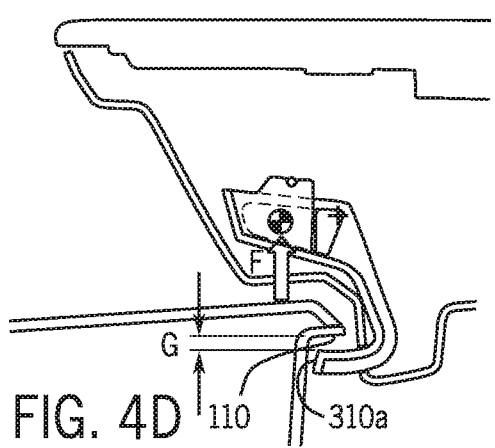
FIG. 4D
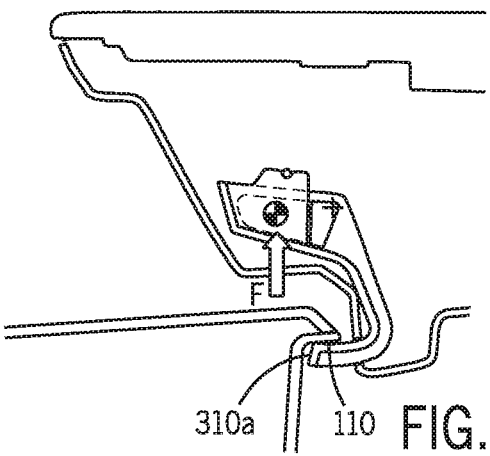
FIG. 4E
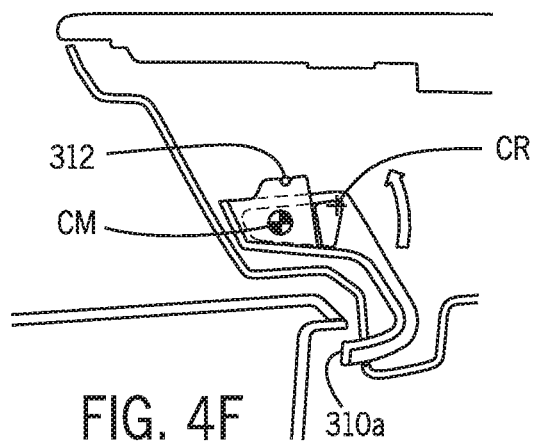
FIG. 4F
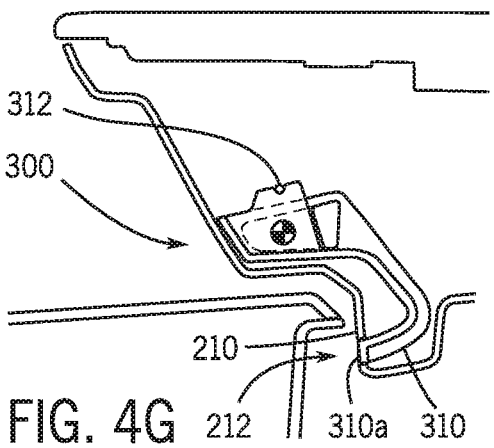
FIG. 4G

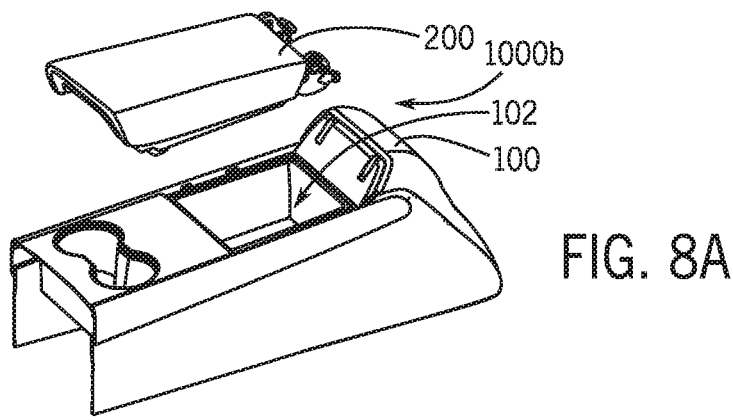
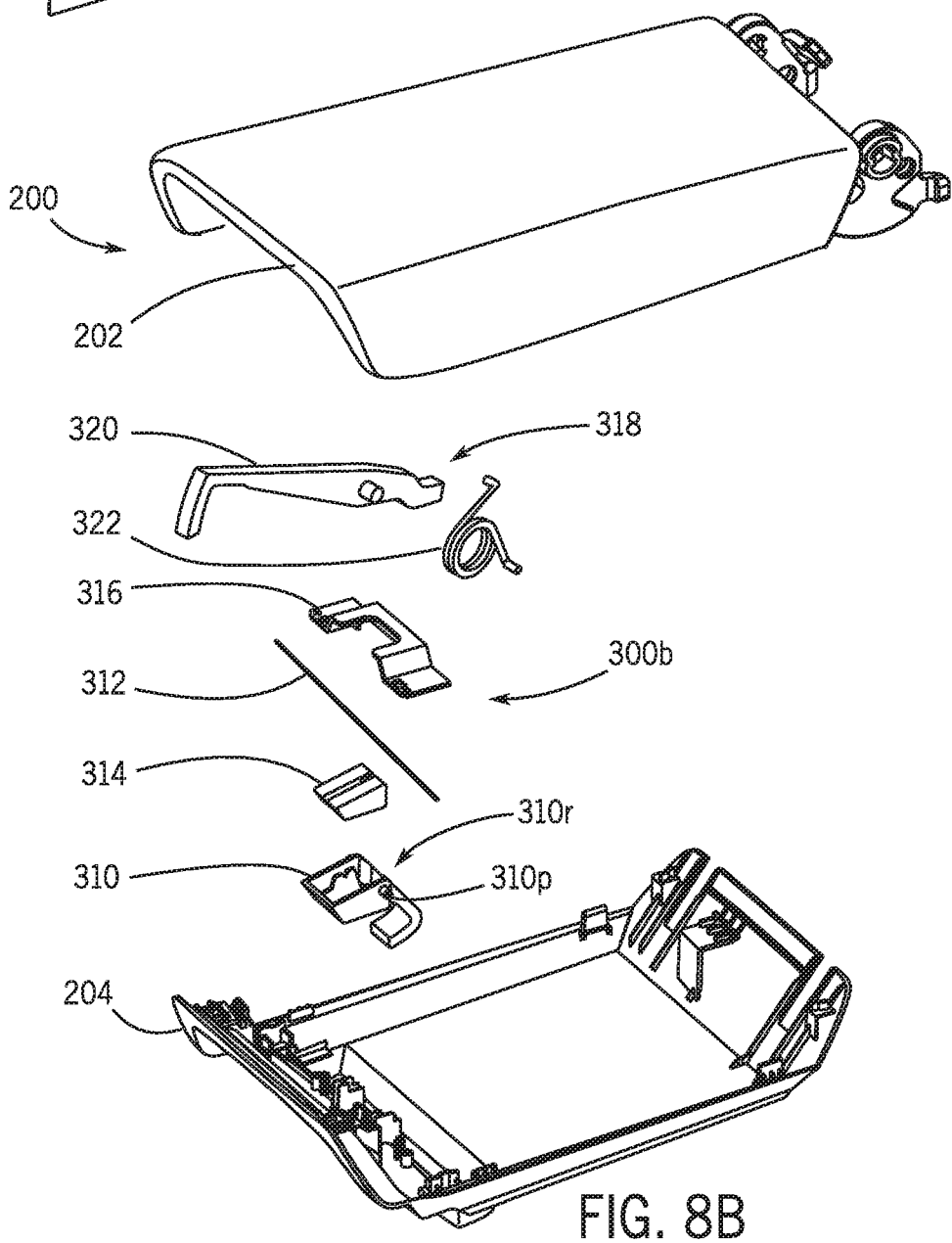
FIG. 8A
FIG. 8B

VEHICLE INTERIOR COMPONENT

CROSS-REFERENCE TO RELATED APPLICATIONS

The present application is a continuation of PCT/International Patent Application No. PCT/US2019/030556 titled "VEHICLE INTERIOR COMPONENT" filed May 3, 2019, which claims the benefit of U.S. Provisional Patent Application No. 62/666,836 titled "VEHICLE INTERIOR COMPONENT" filed May 4, 2018.

The present application claims priority to and incorporates by reference in full the following patent applications: (a) U.S. Provisional Patent Application No. 62/666,836 titled "VEHICLE INTERIOR COMPONENT" filed May 4, 2018; (b) PCT/International Patent Application No. PCT/US2019/030556 titled "VEHICLE INTERIOR COMPONENT" filed May 3, 2019.

FIELD

The present invention relates to a vehicle interior component.

BACKGROUND

It is known to provide a vehicle interior component comprising a base with a bin and a cover movable relative to the base to facilitate access to the bin. It is also known to provide a vehicle interior component configured to lock or latch in response to an inertia force such as applied in an impact event.

It would be advantageous to provide an improved vehicle interior component configured for improved functionality and operation comprising features (and combinations of features) as shown and described in the present application including a blocking mechanism for the cover, including but not limited to an improved latch mechanism configured to be actuated by an inertia force.

SUMMARY

The present invention relates to a vehicle interior component configured to be actuated by an inertia force comprising a base; a cover configured to move relative to the base between a closed position and an open position; and a latch mechanism configured to provide an unlatched state for the cover and a latched state for the cover. The latch mechanism may be configured to provide the latched state when actuated by the inertia force. The latch mechanism may be configured to hold the cover in the unlatched state. The cover may comprise the latch mechanism. The latch mechanism may be configured to extend from the cover in the latched state. The cover may comprise a wall comprising an opening. The latch mechanism may be configured to form a generally continuous surface with the wall of the cover in the unlatched state. The latch mechanism may be configured to move through the opening of the wall of the cover to provide the latched state. The latch mechanism may be configured (a) to rotate relative to the cover; (b) to rotate with the cover relative to the base to engage the base. The latch mechanism may comprise a spring configured to hold the cover in the unlatched state. The component may comprise at least one of (a) a console; (b) a center console; (c) a floor console; (d) an armrest.

The present invention relates to a vehicle interior component configured to be actuated by an inertia force comprising a base; a cover configured to move relative to the base between a closed position and an open position; and a latch mechanism configured to provide an unlatched state for the cover and a latched state for the cover. The latch mechanism may be configured to provide the latched state when actuated by the inertia force to retain the cover in the closed position relative to the base. The latch mechanism may be configured to provide a retracted position to maintain the cover in the unlatched state. The latch mechanism may be configured to move to an extended position when actuated by the inertia force. The cover may be configured for movement from (a) the unlatched state with the cover in the closed position and the latch mechanism in the retracted position to (b) a transition state with the latch mechanism in the extended position to (c) the latched state with the cover in the closed position and the latch mechanism in the extended position. The component may comprise a gap between the latch mechanism and the base in the transition state; the cover may be configured to move through the gap to contact the base in the latched state. The latch mechanism may comprise an inertia latch mechanism comprising a counterweight; the counterweight may be configured to be moved by the inertia force such as from an impact event affecting the vehicle.

The present invention relates to a vehicle interior component configured to be actuated by an inertia force comprising a base; a cover configured to move relative to the base between a closed position and an open position; and a latch mechanism configured to provide an unlatched state for the cover and a latched state for the cover. The latch mechanism may be configured to change state of the cover from the unlatched state to the latched state when actuated by the inertia force. The latch mechanism may comprise a spring configured to hold the cover in the unlatched state. The latch mechanism may comprise a member configured to move into engagement with the base in the latched state when actuated by the inertia force. The member of the latch mechanism may comprise a bar; the bar may be configured to engage a flange of the base in the latched state. The member of the latch mechanism may be configured to provide a gap with the base in the latched state. The gap may be configured to be closed to prevent the cover from moving to the open position. The component may further comprise (a) a counterweight configured to provide mass to move the member toward engagement with the base and (b) a spring mechanism configured to (1) bias the member toward the unlatched state and/or (2) move the member in response to removal of the inertia force.

The present invention relates to a vehicle interior component comprising a base; a cover configured to move relative to the base between a closed position and an open position; and a latch mechanism configured to provide an unlatched state for the cover and a latched state for the cover. The latch mechanism may be configured to provide the latched state when actuated by an inertia force. The cover may comprise the latch mechanism. The latch mechanism may be configured to extend from the cover in the latched state. The cover may comprise a wall comprising an opening; the latch mechanism may be configured to form a generally continuous surface with the wall of the cover in the unlatched state. The cover may comprise a wall comprising an opening; the latch mechanism may be configured to move through the opening of the wall of the cover to provide the latched state. The latch mechanism may be configured to rotate with the cover relative to the base to engage the base. The latch mechanism may be configured (a) to rotate relative to the cover; (b) to rotate with the cover relative to the base to engage the base. The latch mechanism may comprise a bar configured to engage the base in the latched state. The bar of the latch mechanism may be configured to engage a flange of the base in the latched state. The bar of the latch mechanism may be configured to rotate into engagement with the base in the latched state. The bar of the latch mechanism may be configured to provide a gap with the base in the latched state. The gap may be configured to be closed to prevent the cover from moving to the open position. The component may further comprise a counterweight configured to provide mass to move the bar toward engagement with the base. The component may further comprise a spring mechanism configured to at least one of (a) bias the bar in the unlatched state; (b) move the bar in response to removal of the inertia force. The latch mechanism may be configured to move between a retracted position and an extended position. The latch mechanism may be configured to rotate relative to the cover toward the extended position. The cover may be configured for movement from (a) the unlatched state with the cover in the closed position and the latch mechanism in the retracted position to (b) a transition state with the latch mechanism in the extended position to (c) the latched state with the cover in the closed position and the latch mechanism in the extended position. The component may comprise a gap between the latch mechanism and the base in the transition state. The cover may be configured to move through the gap to contact the base in the latched state. The component may further comprise an arm mechanism configured to hold the latch mechanism in the latched state. The arm mechanism may be configured to reset the latch mechanism from the latched state to the unlatched state. The cover may comprise a wall comprising an opening; the arm mechanism may be configured to move through the opening of the wall of the cover hold the latch mechanism in the latched state. The arm mechanism may comprise a projection configured to engage the latch mechanism. The projection of the arm mechanism may be configured to retain the latch mechanism in the latched state. The arm mechanism may be configured to release the latch mechanism from the latched state by disengagement of the projection of the arm mechanism from the latch mechanism. The latch mechanism may comprise a projection configured to engage the arm mechanism. The projection of the latch mechanism may be configured to retain the arm mechanism in the unlatched state. The latch mechanism may be configured to release the arm mechanism by disengagement of the projection of the latch mechanism from the arm mechanism. The arm mechanism may comprise a button; the arm mechanism may be configured to release the latch mechanism from the latched state by actuation of the button of the arm mechanism. The arm mechanism may be rotated by actuation of the button. The component may further comprise an arm mechanism configured to move from (a) a set position to hold the latch mechanism in the latched state to (b) a reset position to provide the unlatched state. The arm mechanism may comprise a button configured to move the arm mechanism from the set position to the reset position to provide the unlatched state. The arm mechanism may comprise a spring configured to move the arm mechanism in response to the inertia force. The cover may be configured to pivot relative to the base between a closed position and an open position. The latch mechanism may comprise a member configured to engage the base in the latched state. The component may comprise at least one of (a) a console; (b) a center console; (c) a floor console; (d) an armrest.

The present invention relates to an interior component for a vehicle configured to be actuated by an inertia force comprising a base; a cover configured to move relative to the base between a closed position and an open position; and a latch mechanism configured to provide an unlatched state for the cover and a latched state for the cover. The latch mechanism may be configured to provide the latched state when actuated by the inertia force to retain the cover in the closed position relative to the base. The latch mechanism may comprise an inertia latch mechanism comprising a counterweight; the counterweight may be configured to be moved by the inertia force such as from an impact event affecting the vehicle.

The present invention relates to an interior component for a vehicle configured to be actuated by an inertia force such as from an impact event and to be actuated by a force applied by an occupant of the vehicle comprising a base; a cover configured to move relative to the base between a closed position and an open position; a latch mechanism configured to provide an unlatched state for the cover and a latched state for the cover; and an arm mechanism configured to provide a button for actuation by the occupant. The latch mechanism may be configured to provide the latched state when actuated by the inertia force to retain the cover in the closed position relative to the base; the arm mechanism may be configured to reset the latch mechanism to the unlatched state when actuated at the button by the occupant so that the cover can be moved to the open position relative to the base.

The present invention relates to a component for a vehicle interior comprising a base comprising a bin; a cover configured to move from a closed position to cover the bin to an open position to uncover the bin; and a mechanism configured to move from a retracted position to allow the cover to move from the closed position to the open position to an extended position to prevent the cover from moving from the closed position to the open position. The mechanism may be configured to move from the retracted position to the extended position in response to a force exceeding a predetermined amount. The mechanism may comprise a latch configured to move from a default position to a blocking position to prevent the cover from moving from the closed position to the open position. The latch may be configured to move from the default position to the blocking position in response to an external force on the latch. The cover may comprise a surface comprising an opening; the latch may be configured to move through the opening of the surface of the cover as the latch moves from the default position to the blocking position. The component may comprise a counterweight configured to provide mass to move the latch from the default position toward the blocking position. The mechanism may comprise a spring configured to bias the latch in the default position. The mechanism may be configured to move the latch from the blocking position to the default position in response to removal of the force exceeding the predetermined amount. The mechanism may be configured to hold the latch in the blocked position in response to the force exceeding the predetermined amount. The mechanism may comprise an arm configured to move from a set position to hold the latch in the blocking position to a reset position to allow movement of the latch from the blocking position to the default position. The mechanism may comprise a spring for the arm configured to hold the arm in the set position. The component may comprise a button configured to move the arm from the set position to the reset position to allow the latch to move from the blocking position to the default position. The cover may comprise a surface comprising an opening; the button may be configured to move through the opening of the surface of the cover as the latch moves from the default position to the blocking position. The mechanism may comprise a counterweight configured to move from a biased position to a rotated position to prevent the cover from moving from the closed position to the open position. The mechanism may comprise a spring configured to bias the mechanism in the retracted position. The mechanism may comprise a spring configured to move the mechanism from the extended position to the retracted position. The cover may comprise the mechanism. The force may comprise an inertial force.

The present invention relates to a component for a vehicle interior comprising a base comprising a bin; and a cover configured for adjustment from an unlatched state covering the bin to an open state uncovering the bin. The cover may be configured for adjustment from the unlatched state to a latched state covering the bin in response to a force exceeding a predetermined amount. The component may comprise a mechanism configured to adjust the cover between the unlatched state and the latched state. The mechanism may be configured to move from a retracted position to an extended position to adjust the cover from the unlatched state to the latched state. The mechanism may comprise a latch configured to move from a default position to a blocking position to adjust the cover from the unlatched state to the latched state. The latch may be configured to move from the default position to the blocking position in response to an external force on the latch. The cover may comprise a surface comprising an opening; the latch may be configured to move through the opening of the surface of the cover as the latch moves from the default position to the blocking position. The component may comprise a counterweight configured to provide mass to move the latch from the default position toward the blocking position. The mechanism may comprise a spring configured to bias the latch in the default position. The mechanism may be configured to move the latch from the blocking position to the default position in response to removal of the force exceeding the predetermined amount. The mechanism may be configured to hold the cover in the latched state in response to the force exceeding the predetermined amount. The mechanism may comprise an arm configured to move from a set position to hold the cover in the latched state to a reset position to allow adjustment of the cover from the latched state to the unlatched state. The mechanism may comprise a spring for the arm configured to hold the arm in the set position. The component may comprise a button configured to move the arm from the set position to the reset position to allow the cover to adjust from the latched state to the unlatched state. The cover may comprise a surface comprising an opening; the button may be configured to move through the opening of the surface of the cover as the cover adjusts from the unlatched state to the latched state. The mechanism may comprise a counterweight configured to move from a biased position to a rotated position to adjust the cover from the unlatched state to the latched state. The mechanism may comprise a spring configured to bias the cover in the unlatched state. The mechanism may comprise a spring configured to adjust the cover from the latched state to the unlatched state. The cover may comprise the mechanism. The force may comprise an inertial force.

FIGURES

FIG. 1A is a schematic perspective view of a vehicle according to an exemplary embodiment.

FIGS. 1B to 1C are schematic partial perspective views of a vehicle interior according to an exemplary embodiment.

FIGS. 1D to 1E are schematic perspective views of a conventional vehicle interior component shown as a console assembly according to an exemplary embodiment.

FIG. 1F is a schematic perspective view of a vehicle interior component shown as a console assembly according to an exemplary embodiment.

FIG. 3A is a schematic exploded perspective view of a vehicle interior component shown as a console assembly according to an exemplary embodiment.

FIG. 3B is a schematic exploded perspective view of a cover and a mechanism of a vehicle interior component according to an exemplary embodiment.

FIG. 3C is a schematic perspective view of a vehicle interior component shown as a console assembly according to an exemplary embodiment.

FIGS. 4A to 4G are schematic partial section views of a vehicle interior component according to an exemplary embodiment.

FIG. 8A is a schematic exploded perspective view of a vehicle interior component shown as a console assembly according to an exemplary embodiment.

FIG. 8B is a schematic exploded perspective view of a cover and a mechanism of a vehicle interior component according to an exemplary embodiment

DESCRIPTION

As shown schematically according to an exemplary embodiment in FIGS. 1A-1C, a vehicle V may include an interior I with a floor console FC comprising a base B and an armrest AR covering a storage compartment of floor console FC. Armrest AR may be configured to move between a closed position and an open position to facilitate access to the storage compartment.

As shown schematically according to an exemplary embodiment in FIGS. 1D-1E, a conventional floor console may comprise a cover shown as an armrest AR1 covering a storage compartment SC. An external force F may be applied to armrest AR1, for example when the vehicle travels over a speed bump or rough road. Conventional armrest AR1 may move from a closed position to an open position as a result of the application of force F.

As shown schematically according to an exemplary embodiment in FIG. 1F, a floor console may comprise a cover shown as an armrest AR2 covering a storage compartment. An external force F may be applied to armrest AR2. Armrest AR2 may be held in a closed position in response to application of force F of a predetermined amount. Armrest AR2 may be configured to move from a closed position as shown in FIG. 1F to an open position in response to application of an opening force of less than the predetermined amount.

Figure 2A:
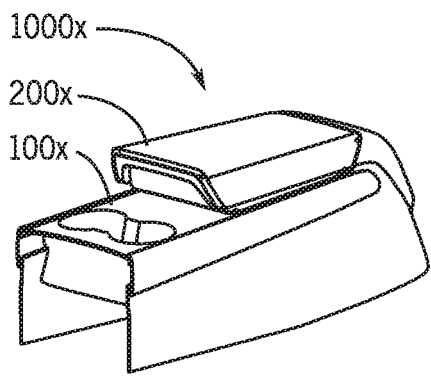
FIGS. 2A to 2C are schematic perspective views of a conventional vehicle interior component shown as a console assembly according to an exemplary embodiment.
Figure 2B:
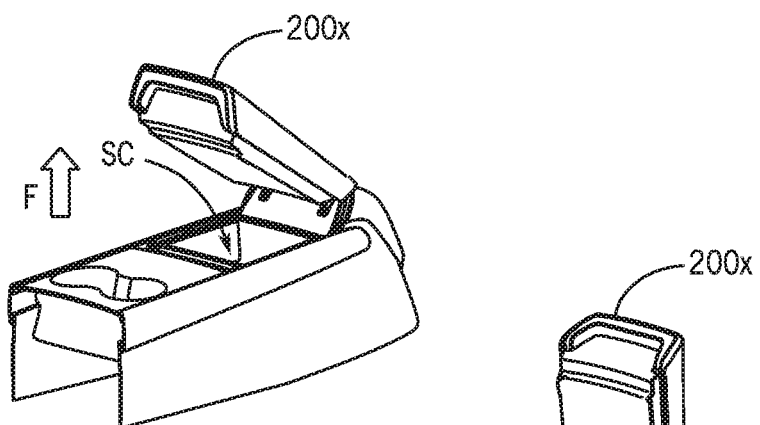
Figure 2C:
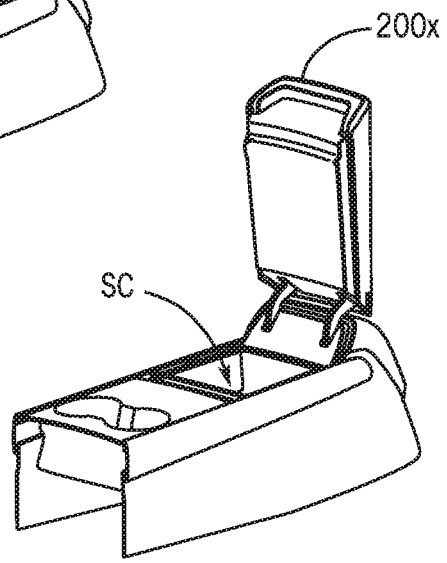

As shown schematically according to an exemplary embodiment in FIGS. 2A-2C, a conventional vehicle interior component shown as a floor console 1000x may comprise a cover shown as an armrest 200x covering a bin or storage compartment SC. An external force F may be applied to cover 200x, for example when the vehicle travels over a speed bump or rough road. Cover 200x may move from a closed position as shown schematically in FIG. 2A to an open position as shown schematically in FIG. 2C as a result of the application of force F exceeding a predetermined amount.

Figure 2D:
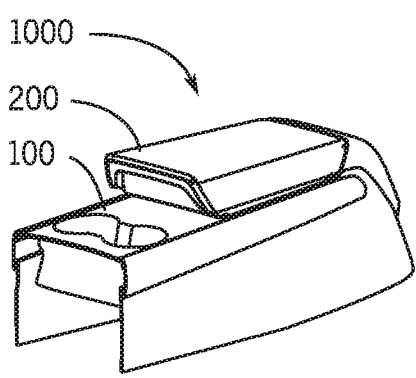
FIGS. 2D to 2E are schematic perspective views of a vehicle interior component shown as a console assembly according to an exemplary embodiment.
Figure 2E:
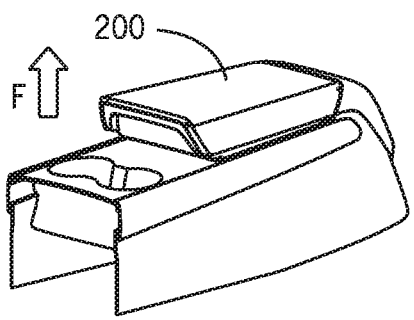
Figure 5A:
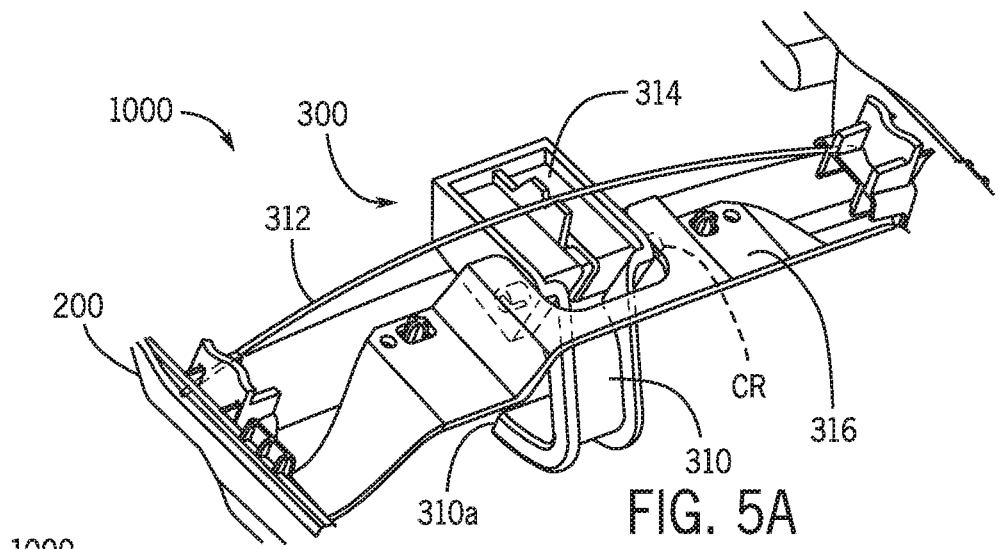
FIG. 5A is a schematic partial perspective view of a vehicle interior component according to an exemplary embodiment.
Figure 5B:
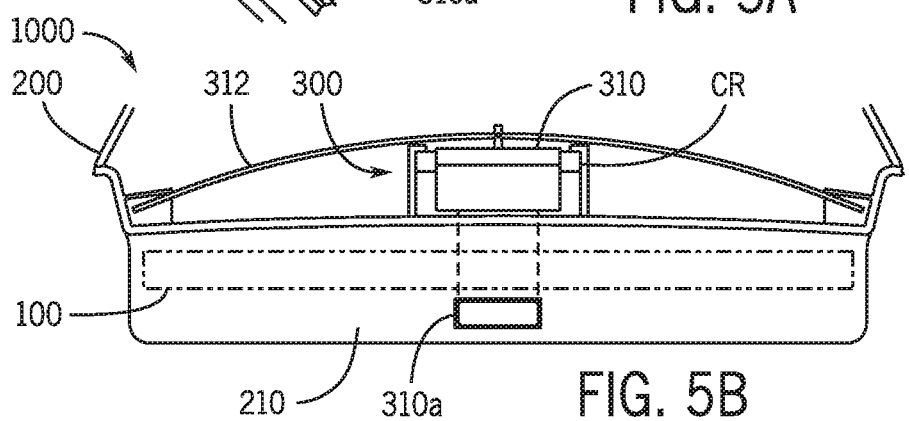
FIGS. 5B to 5D are schematic partial section views of a vehicle interior component according to an exemplary embodiment.
Figure 5C:
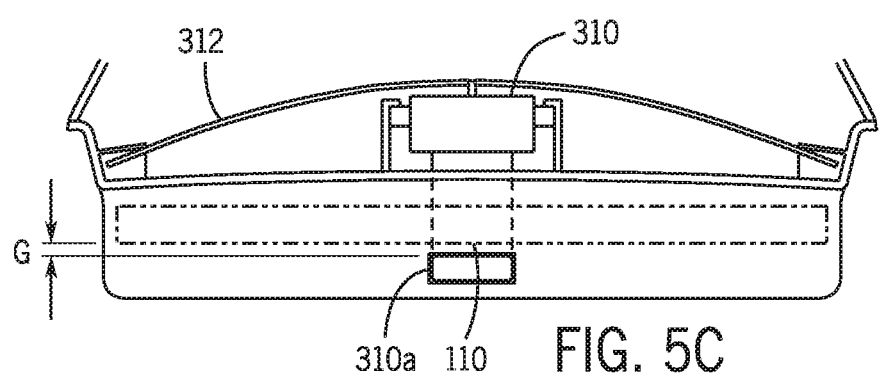
Figure 5D:
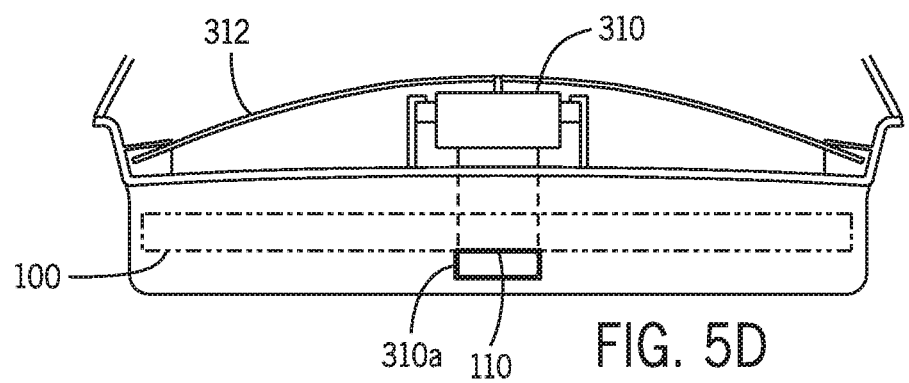
Figure 6A:
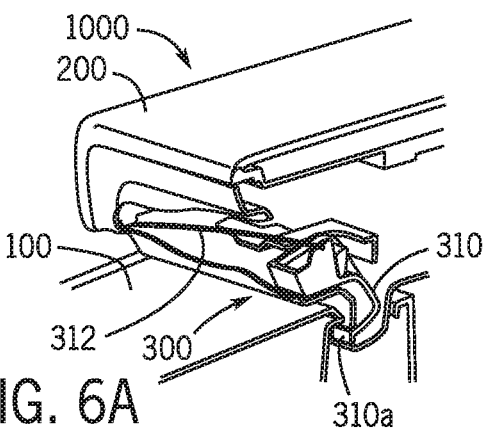
FIGS. 6A to 6D are schematic partial perspective views of a vehicle interior component according to an exemplary embodiment.
Figure 7A:
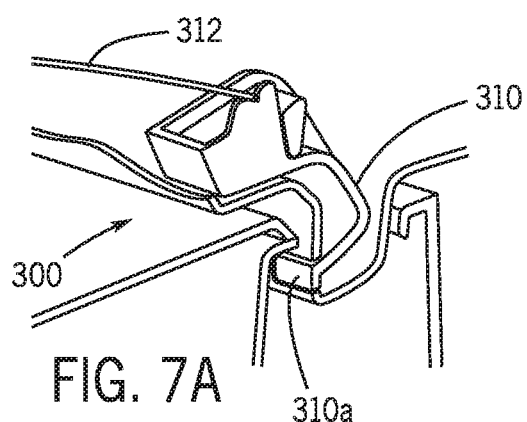
FIGS. 7A to 7D are schematic partial perspective views of a vehicle interior component according to an exemplary embodiment.
Figure 6B:
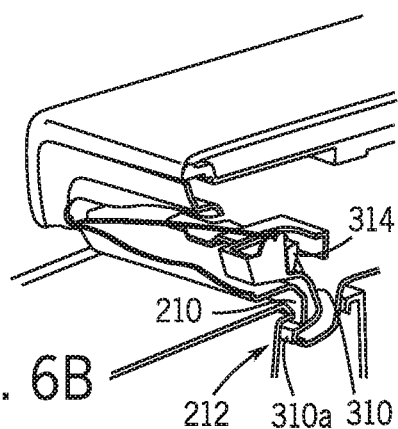
Figure 7B:
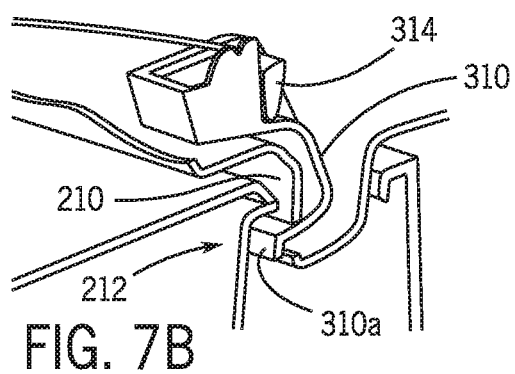
Figure 6C:
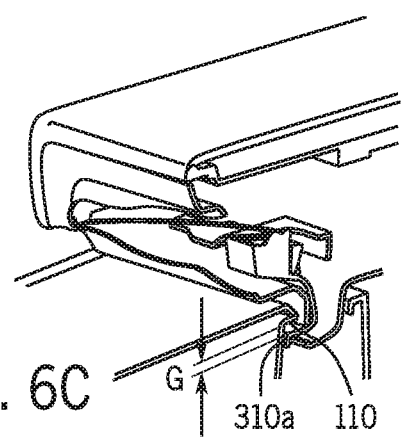
Figure 7C:
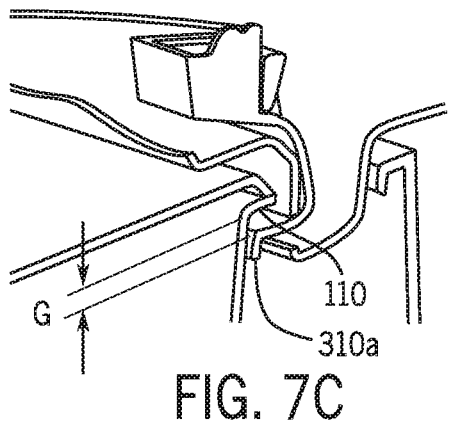
Figure 6D:
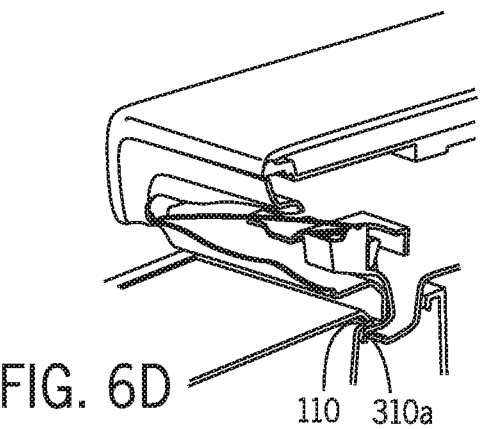
Figure 7D:
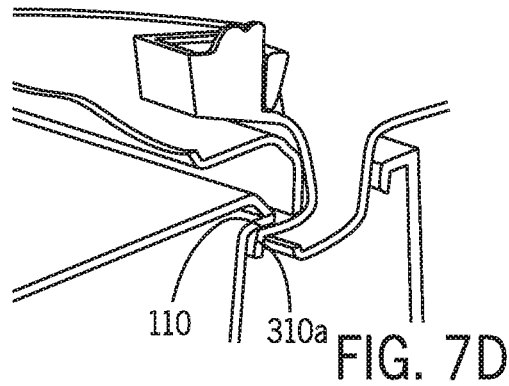

As shown schematically according to an exemplary embodiment in FIGS. 2D and 2E, a vehicle interior component 1000 shown as a floor console may comprise a base 100 and a cover 200 shown as an armrest covering a bin or storage compartment. An external force F may be applied to cover 200, for example when the vehicle travels over a speed bump or rough road. Cover 200 may be held in a closed position in response to application of force F of a predetermined amount. Armrest AR2 may be configured to move from a closed position as shown in FIG. 1E to an open position in response to application of an opening force of less than the predetermined amount. Cover 200 may be configured for adjustment from an unlatched state covering the bin as shown schematically in FIG. 2D to an open state uncovering the bin. Cover 200 may be configured for adjustment from the unlatched state to a latched state covering the bin as shown schematically in FIG. 2E in response to a force exceeding a predetermined amount.

As shown schematically according to an exemplary embodiment in FIGS. 3A-3C, vehicle interior component 1000 may comprise a base 100, a cover 200 and a latch mechanism 300. Base 100 may comprise a bin or storage compartment 102. Cover 200 may comprise a top portion 202 and a base portion 204. Latch mechanism 300 may comprise a latch 310, a spring 312, a counterweight 314 and a bracket 316. Cover 200 may comprise latch mechanism 300. Bracket 316 may be coupled or fastened to base portion 204 of cover 200. Counterweight 314 may be coupled to latch 310; latch 310 may comprise a receptacle or holder 310r configured to receive counterweight 314. Counterweight 314 and latch 310 may be coupled in order to move together relative to cover 200 and base 100. Bracket 316 may be coupled to base portion 204 of cover 200, for example by a snap feature or a fastener such as a screw. Base portion 204 of cover 200 may comprise a feature to receive latch 310 and guide rotation of latch 310 relative to cover 200; latch 310 may comprise a pin 310p configured to rotate within the guide of base portion 204 of cover 200. Bracket 316 may prevent translation of latch 310 and allow rotation of latch 310. Bracket 316 may hold pin 310p of latch 310 in the feature of base portion 204 of cover 200. Spring 312 may be coupled to base portion 204 of cover 200. Spring 312 may be bent or preloaded against latch 310 and base portion 204 of cover 200 to provide a force to latch 310 or to bias latch 310. Spring 312 may be configured to bend to allow rotation of latch 310. Cover 200 may comprise latch mechanism 300. Latch mechanism 300 may be assembled to base portion 204 of cover 200 and covered by top portion 202 of cover 200.

As shown schematically according to an exemplary embodiment in FIGS. 8A and 8B, a vehicle interior component 1000b may comprise a base 100, a cover 200 and a latch mechanism 300b. Base 100 may comprise a bin or storage compartment 102. Cover 200 may comprise a top portion 202 and a base portion 204. Latch mechanism 300b may comprise a latch 310, a spring 312, a counterweight 314, a bracket 316 and an arm mechanism 318. Cover 200 may comprise latch mechanism 300b. Bracket 316 may be coupled or fastened to base portion 204 of cover 200. Counterweight 314 may be coupled to latch 310; latch 310 may comprise a receptacle or holder 310r configured to receive counterweight 314. Counterweight 314 and latch 310 may be coupled to move together relative to cover 200 and base 100. Bracket 316 may be coupled to base portion 204 of cover 200, for example by a snap feature or a fastener such as a screw. Base portion 204 of cover 200 may comprise a feature to receive latch 310 and guide rotation of latch 310 relative to cover 200; latch 310 may comprise a pin 310p configured to rotate within the guide of base portion 204 of cover 200. Bracket 316 may prevent translation of latch 310 and allow rotation of latch 310. Bracket 316 may hold pin 310p of latch 310 in the feature of base portion 204 of cover 200. Spring 312 may be coupled to base portion 204 of cover 200. Spring 312 may be bent or preloaded against latch 310 and base portion 204 of cover 200 to provide a force to latch 310 or to bias latch 310. Spring 312 may be configured to bend to allow rotation of latch 310. Cover 200 may comprise latch mechanism 300b. Latch mechanism 300b may be assembled to base portion 204 of cover 200 and covered by top portion 202 of cover 200.

As shown schematically according to an exemplary embodiment in FIG. 8B, arm mechanism 318 may comprise an arm 320 and a spring 322. Arm 320 may be coupled to base portion 204 of cover 200, for example by a pivot. Base portion 204 of cover 200 may comprise a feature to receive arm 320 and guide rotation of arm 320 relative to cover 200. Latch mechanism 300b may comprise a pin configured to rotate within the feature of base portion 204 of cover 200. Spring 322 may be coupled to base portion 204 of cover 200 and arm 320. Spring 322 may be preloaded against arm 320 and base portion 204 of cover 200 to provide a force Fs to arm 320 or to bias arm 320. Cover 200 may comprise latch mechanism 300b. Cover 200 may comprise a wall 220 comprising an opening 222. Latch 310 may comprise a projection or edge 310b. Arm 320 may comprise a projection or edge 320b.

As shown schematically according to an exemplary embodiment in FIGS. 3A-3C, 4A-4G, 5A-5D, 6A-6D, 7A-7D, 8A, 8B, 9A-9C, 10A-10F and 11A-11E, a vehicle interior component 1000/1000b may comprise a base 100; a cover 200 configured to move relative to base 100 between a closed position and an open position and a latch mechanism 300/300b configured to provide an unlatched state for cover 200 and a latched state for cover 200. Latch mechanism 300/300b may be configured to provide the latched state when actuated by an inertia force. Cover 200 may comprise latch mechanism 300/300b. Latch mechanism 300/300b may be configured to extend from cover 200 in the latched state. Cover 200 may comprise a wall 210 comprising an opening 212; latch mechanism 300/300b may be configured to form a generally continuous surface with wall 210 of cover 200 in the unlatched state. Cover 200 may comprise a wall 210 comprising an opening 212; latch mechanism 300/300b may be configured to move through opening 212 of wall 210 of cover 200 to provide the latched state. Latch mechanism 300/300b may be configured to rotate with cover 200 relative to base 100 to engage base 100. Latch mechanism 300/300b may be configured (a) to rotate relative to cover 200; (b) to rotate with cover 200 relative to base 100 to engage base 100. Latch mechanism 300/300b may comprise a bar 310a configured to engage base 100 in the latched state. Bar 310a of latch mechanism 300/300b may be configured to engage a flange 110 of base 100 in the latched state. Bar 310a of latch mechanism 300/300b may be configured to rotate into engagement with base 100 in the latched state. Bar 310a of latch mechanism 300/300b may be configured to provide a gap G with base 100 in the latched state. Gap G may be configured to be closed to prevent cover 200 from moving to the open position. Component 1000/1000b may further comprise a counterweight 314 configured to provide mass to move bar 310a toward engagement with base 100. Component 1000/1000b may further comprise a spring mechanism 312 configured to at least one of (a) bias bar 310a in the unlatched state; (b) move bar 310a in response to removal of the inertia force. Latch mechanism 300/300b may be configured to move between a retracted position and an extended position. Latch mechanism 300/300b may be configured to rotate relative to cover 200 toward the extended position. Cover 200 may be configured for movement from (a) the unlatched state with cover 200 in the closed position and latch mechanism 300/300b in the retracted position to (b) a transition state with latch mechanism 300/300b in the extended position to (c) the latched state with cover 200 in the closed position and latch mechanism 300/300b in the extended position. Component 1000/1000b may comprise a gap G between latch mechanism 300/300b and base 100 in the transition state. Cover 200 may be configured to move through gap G to contact base 100 in the latched state. Cover 200 may be configured to pivot relative to base 100 between a closed position and an open position. Latch mechanism 300/300b may comprise a member 310a configured to engage base 100 in the latched state. Component 1000/1000b may comprise at least one of (a) a console; (b) a center console; (c) a floor console; (d) an armrest.

As shown schematically according to an exemplary embodiment in FIGS. 8A, 8B, 9A-9C, 10A-10F and 11A-11E, component 1000b may further comprise an arm mechanism 318 configured to hold latch mechanism 300/300b in the latched state. Arm mechanism 318 may be configured to reset latch mechanism 300/300b from the latched state to the unlatched state. Cover 200 may comprise a wall 210 comprising an opening 212; arm mechanism 318 may be configured to move through opening 212 of wall 210 of cover 200 hold latch mechanism 300/300b in the latched state. Arm mechanism 318 may comprise a projection 320b configured to engage latch mechanism 300/300b. Projection 320b of arm mechanism 318 may be configured to retain latch mechanism 300/300b in the latched state. Arm mechanism 318 may be configured to release latch mechanism 300/300b from the latched state by disengagement of projection 320b of arm mechanism 318 from latch mechanism 300/300b. Latch mechanism 300/300b may comprise a projection 310b configured to engage arm mechanism 318. Projection 310b of latch mechanism 300/300b may be configured to retain arm mechanism 318 in the unlatched state. Latch mechanism 300/300b may be configured to release arm mechanism 318 by disengagement of projection 310b of latch mechanism 300/300b from arm mechanism 318. Arm mechanism 318 may comprise a button 320a; arm mechanism 318 may be configured to release latch mechanism 300/300b from the latched state by actuation of button 320a of arm mechanism 318. Arm mechanism 318 may be rotated by actuation of button 320a. Component 1000/1000b may further comprise an arm mechanism 318 configured to move from (a) a set position to hold latch mechanism 300/300b in the latched state to (b) a reset position to provide the unlatched state. Arm mechanism 318 may comprise a button 320a configured to move arm mechanism 318 from the set position to the reset position to provide the unlatched state. Arm mechanism 318 may comprise a spring 322 configured to move arm mechanism 318 in response to the inertia force.

As shown schematically according to an exemplary embodiment in FIGS. 3A-3C, 4A-4G, 5A-5D, 6A-6D, 7A-7D, 8A, 8B, 9A-9C, 10A-10F and 11A-11E, an interior component 1000/1000b for a vehicle configured to be actuated by an inertia force may comprise a base 100; a cover 200 configured to move relative to base 100 between a closed position and an open position; and a latch mechanism 300/300b configured to provide an unlatched state for cover 200 and a latched state for cover 200. Latch mechanism 300/300b may be configured to provide the latched state when actuated by the inertia force to retain cover 200 in the closed position relative to base 100. Latch mechanism 300/300b may comprise an inertia latch mechanism comprising a counterweight 314; counterweight 314 may be configured to be moved by the inertia force such as from an impact event affecting the vehicle.

As shown schematically according to an exemplary embodiment in FIGS. 8A, 8B, 9A-9C, 10A-10F and 11A-11E, an interior component 1000b for a vehicle may be configured to be actuated by an inertia force such as from an impact event and to be actuated by a force applied by an occupant of the vehicle comprising a base 100; a cover 200 configured to move relative to base 100 between a closed position and an open position; a latch mechanism 300b configured to provide an unlatched state for cover 200 and a latched state for cover 200 and an arm mechanism 318 configured to provide a button 320a for actuation by the occupant. Latch mechanism 300b may be configured to provide the latched state when actuated by the inertia force to retain cover 200 in the closed position relative to base 100; arm mechanism 318 may be configured to reset latch mechanism 300b to the unlatched state when actuated at button 320a by the occupant so that cover 200 can be moved to the open position relative to base 100.

As shown schematically according to an exemplary embodiment in FIGS. 4A-4G, 5A-5D, 6A-6D, 7A-7D, 8A, 8B, 9A-9C, 10A-10F and 11A-11E, cover 200 may be configured to move from a closed position to cover bin 102 (as shown schematically in FIGS. 4A-4D, 4G, 5B, 6A-6C, 7A-7C, 9A-9C, 10A-10F and 11A-11E) to an open position to uncover bin 102. Latch mechanism 300 may be configured to move from a retracted position (as shown schematically in FIGS. 4A, 4B, 4G, 5B, 6A, 7A, 9A, 10A and 11E) to allow cover 200 to move from the closed position to the open position to an extended position (as shown schematically in FIGS. 4D, 4E, 5C, 5D, 6C, 6D, 7C, 7D, 9B, 9C, 10C-10F and 11A-11C) to prevent cover 200 from moving from the closed position to the open position. Latch mechanism 300 may be configured to move from the retracted position to the extended position in response to a force exceeding a predetermined amount. Latch 310 of latch mechanism 300 may be configured to move from a default position (as shown schematically in FIGS. 4A, 4B, 4G, 5B, 6A, 7A, 9A, 10A and 11E) to a blocking position (as shown schematically in FIGS. 4D, 4E, 5C, 5D, 6C, 6D, 7C, 7D, 9B, 9C, 10C-10F and 11A-11C) to prevent cover 200 from moving from the closed position to the open position. Latch 310 may be configured to move from the default position to the blocking position in response to an external force F on vehicle interior component 1000 or latch 310. Cover 200 may comprise a wall 210 comprising an opening 212; latch 310 may be configured to move through opening 212 of wall 210 of cover 200 as latch 310 moves from the default position to the blocking position (as shown schematically in FIGS. 4B-4D, 5B-5C, 6A-6C, 7A-7C, 9A-9C and 10A-10D). Latch 310 may comprise a bar 310a configured to move through opening 212 of wall 210 of cover 200 as latch 310 moves from the default position to the blocking position (as shown schematically in FIGS. 4B-4D, 5B-5C, 6A-6C, 7A-7C, 9A-9C and 10A-10D). Counterweight 314 may be configured to provide mass to move latch 310 from the default position toward the blocking position (as shown schematically in FIGS. 4C-4D, 6B-6C and 7A-7C); counterweight 314 may be configured to move from a biased position (as shown schematically in FIGS. 4A, 4B, 4G, 6A and 7A) to a rotated position (as shown schematically in FIGS. 4D, 4E, 6C, 6D, 7C and 7D) to prevent cover 200 from moving from the closed position to the open position. Counterweight 314 and latch 310 may comprise a center of mass CM and a center of rotation CR as shown schematically in FIG. 4C. Spring 312 of latch mechanism 300 may be configured to bias latch 310 in the default position (as shown schematically in FIGS. 4A, 4B, 4G, 5A, 5B, 6A and 7A). Latch mechanism 300 may be configured to move latch 310 from the blocking position to the default position in response to removal of the force exceeding the predetermined amount. Spring 312 may be configured to move latch 310 from the blocking position to the default position in response to removal of the force exceeding the predetermined amount; spring 312 may be configured to bias latch mechanism 300 in the retracted position; spring 312 may be configured to move latch mechanism 300 from the extended position to the retracted position. Cover 200 may comprise latch mechanism 300. Force F may comprise an inertial force. Base 100 may comprise a flange, edge or wall 110 (as shown schematically in FIGS. 4D, 4E, 6C, 6D, 7C and 7D). Bar 310a of latch 310 may be configured to contact flange 110 of base 100 to prevent cover 200 from moving from the closed position to the open position. A gap G may be provided between bar 310a of latch 310 and flange 110 of base 100 (as shown schematically in FIGS. 4D, 5C, 6C and 7C). Gap G may be provided between bar 310a of latch 310 and flange 110 of base 100 to allow latch 310 to move between the default position and the blocking position regardless of variations due to manufacturing and assembly. Cover 200 may be configured to move from the closed position toward the open position through gap G until bar 310a of latch 310 contacts flange 110 of base 100 as shown schematically in FIGS. 4E, 5D, 6D and 7D.

As shown schematically according to an exemplary embodiment in FIGS. 4A-4G, 5A-5D, 6A-6D, 7A-7D, 8A, 8B, 9A-9C, 10A-10F and 11A-11E, cover 200 may be configured for adjustment from an unlatched state covering bin 102 (as shown schematically in FIGS. 4A, 4B, 5B, 6A and 7A) to a latched state covering bin 102 (as shown schematically in FIGS. 4D, 4E, 5D, 6C, 6D, 7C and 7D) in response to a force F exceeding a predetermined amount (as shown schematically in FIG. 4C). Latch mechanism 300 may be configured to adjust cover 200 between the unlatched state and the latched state. Latch mechanism 300 may be configured to move from a retracted position (as shown schematically in FIGS. 4A, 4B, 5B, 6A and 7A) to an extended position (as shown schematically in FIGS. 4D, 4E, 5C, 5D, 6C, 6D, 7C and 7D) to adjust cover 200 from the unlatched state to the latched state. Latch 310 of latch mechanism 300 may be configured to move from a default position (as shown schematically in FIGS. 4A, 4B, 5B, 6A and 7A) to a blocking position (as shown schematically in FIGS. 4D, 4E, 5C, 5D, 6C, 6D, 7C and 7D) to adjust cover 200 from the unlatched state to the latched state. Latch 310 may be configured to move from the default position to the blocking position in response to an external force on latch 310 (as shown schematically in FIG. 4C). Cover 200 may comprise a wall 210 comprising an opening 212; latch 310 may be configured to move through opening 212 of wall 210 of cover 200 as latch 310 moves from the default position to the blocking position (as shown schematically in FIGS. 4B-4D, 5B-5C, 6A-6C and 7A-7C). Counterweight 314 may be configured to provide mass to move latch 310 from the default position toward the blocking position (as shown schematically in FIGS. 4C-4D, 6B-6C and 7B-7C); counterweight 314 may be configured to move from a biased position (as shown schematically in FIGS. 4A, 4B, 6A and 7A) to a rotated position (as shown schematically in FIGS. 4D, 4E, 6C, 6D, 7C and 7D) to adjust cover 200 from the unlatched state to the latched state. Spring 312 of latch mechanism 300 may be configured to bias latch 310 in the default position (as shown schematically in FIGS. 4A, 4B, 5A, 5B, 6A and 7A). Latch mechanism 300 may be configured to move latch 310 from the blocking position to the default position in response to removal of force F exceeding the predetermined amount. Spring 312 may be configured to bias cover 200 in the unlatched state; spring 312 may be configured to adjust cover 200 from the latched state to the unlatched state. Cover 200 may comprise latch mechanism 300. Force F may comprise an inertial force. Bar 310a of latch 310 may be configured to contact flange 110 of base 100 when cover 200 is in the latched state. Gap G may be provided between bar 310a of latch 310 and flange 110 of base 100 when cover 200 is in the latched state (as shown schematically in FIGS. 4D, 5C, 6C and 7C).

Figure 9A:
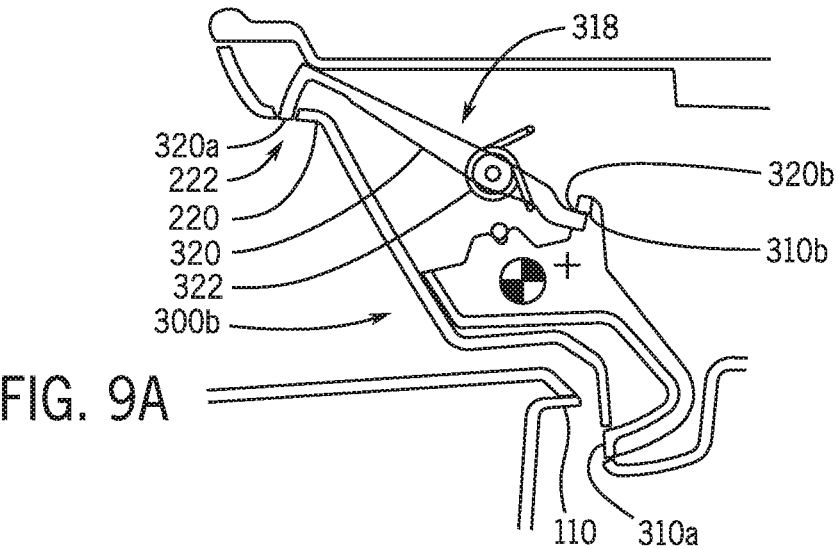
FIGS. 9A to 9C are schematic partial section views of a vehicle interior component according to an exemplary embodiment.
Figure 9B:
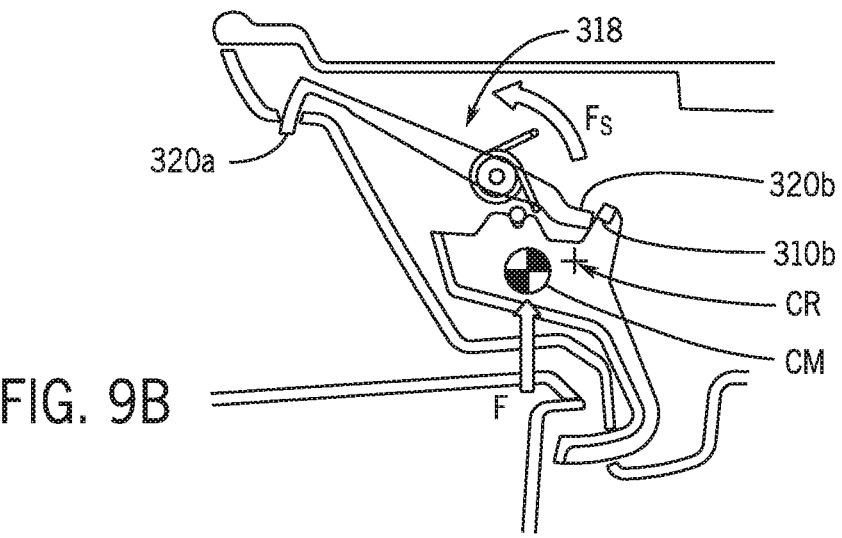
Figure 9C:
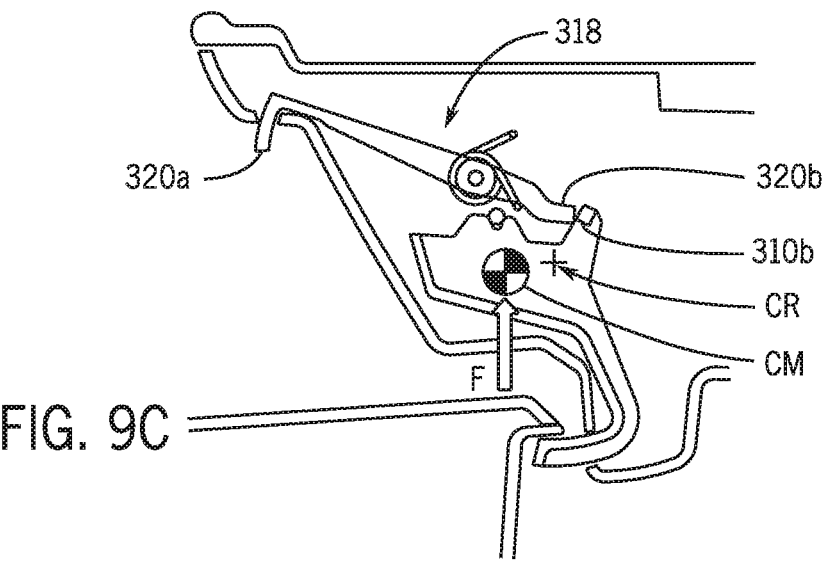
Figures 10A, 10B:
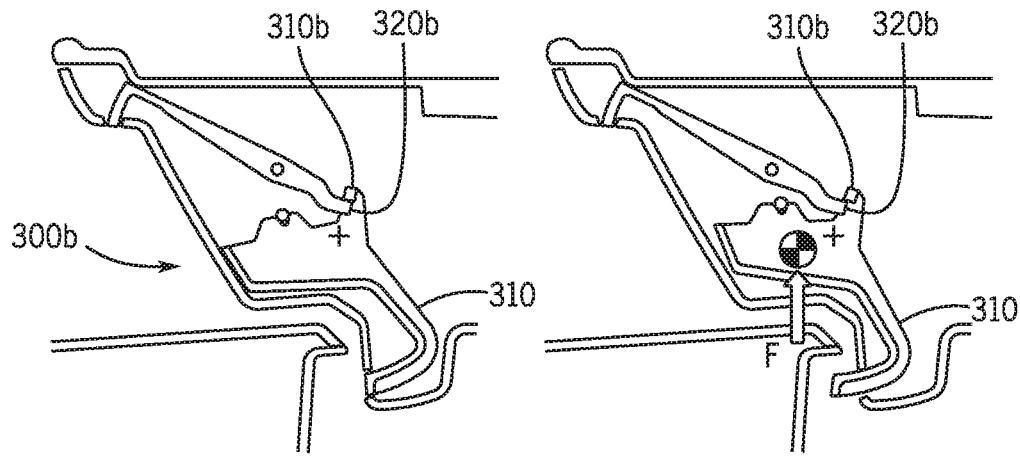
FIGS. 10A to 10F are schematic partial section views of a vehicle interior component according to an exemplary embodiment.
Figures 10C, 10D:
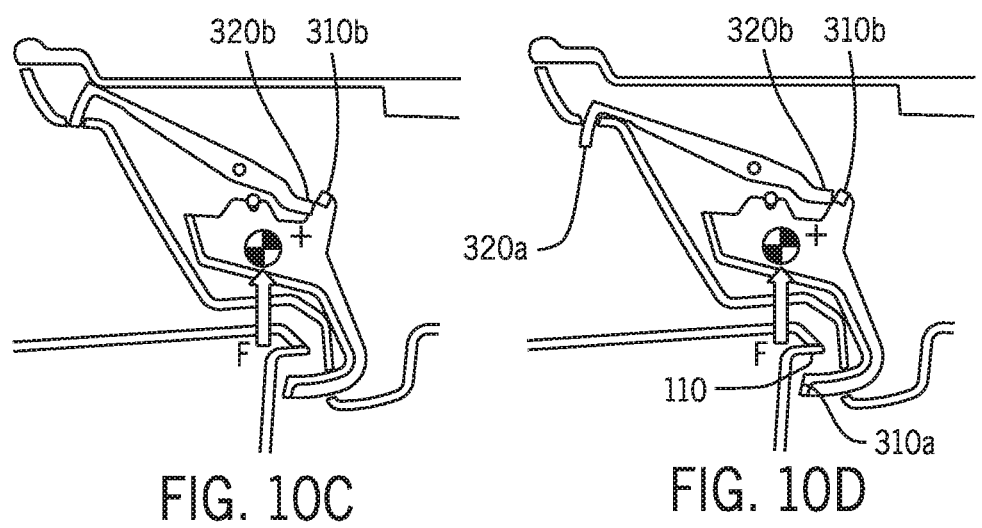
Figures 10E, 10F:
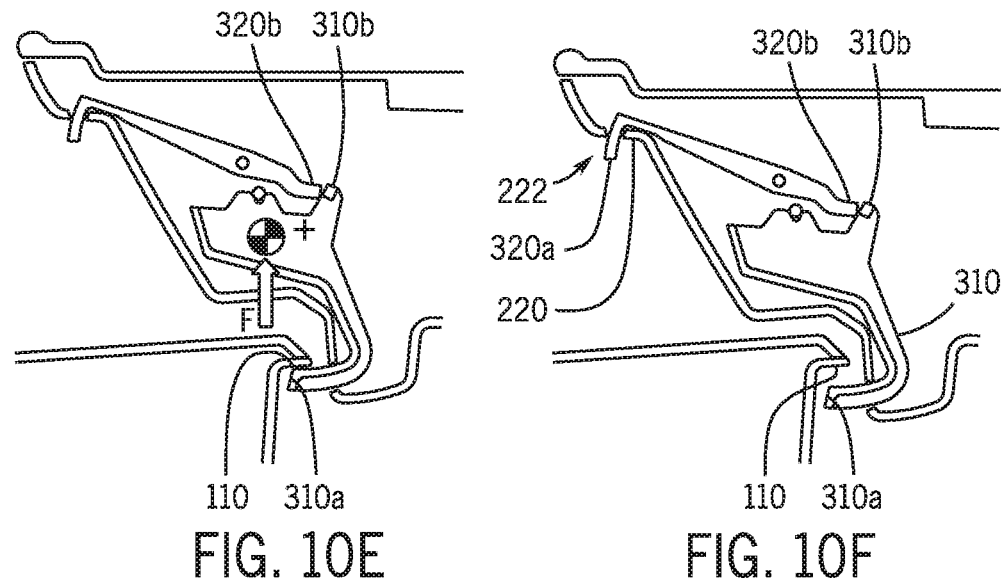
Figure 11A:
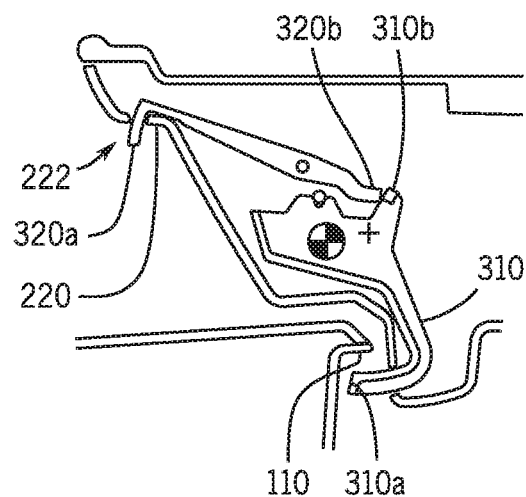
FIGS. 11A to 11E are schematic partial section views of a vehicle interior component according to an exemplary embodiment.
Figure 11B:
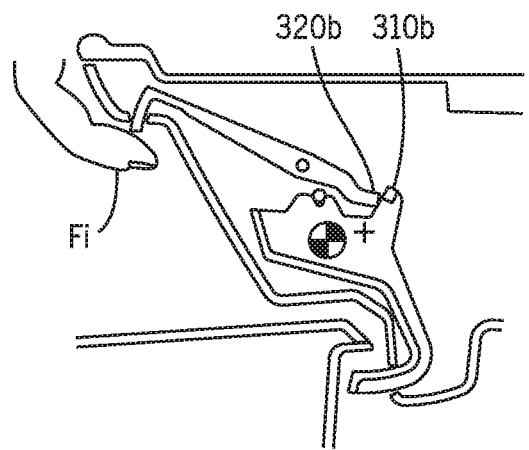
Figure 11C:
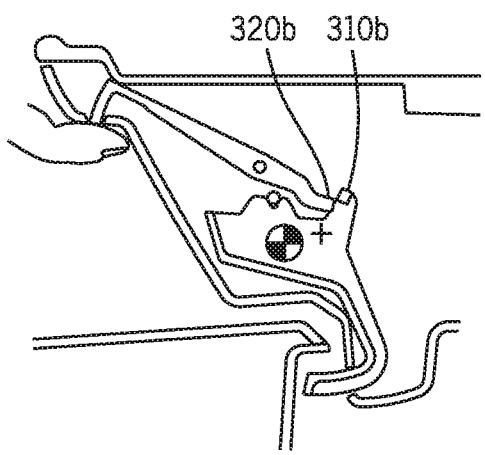
Figure 11D:
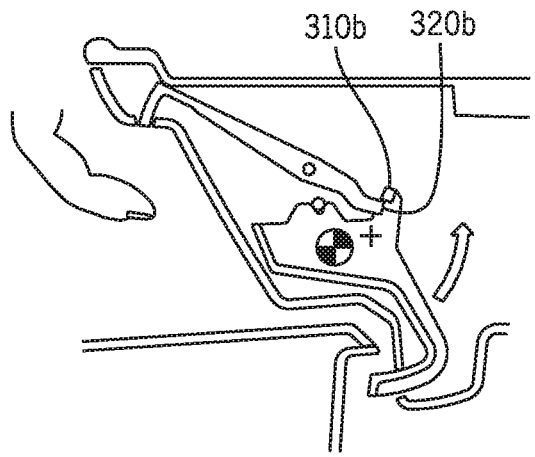
Figure 11E:
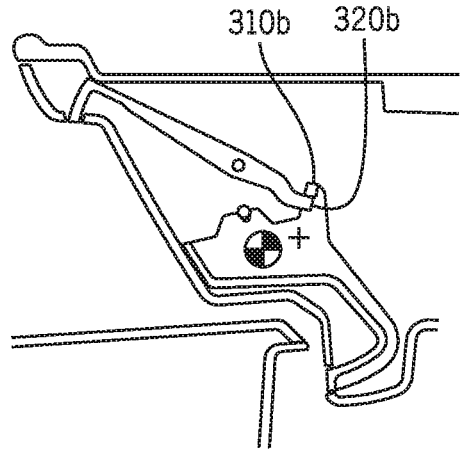

As shown schematically according to an exemplary embodiment in FIG. 9C, latch mechanism 300b may be configured to hold latch 310 in the blocked position in response to a force exceeding the predetermined amount. Arm 320 may be configured to move from a set position (as shown schematically in FIG. 9C) to hold latch 310 in the blocking position to a reset position (as shown schematically in FIG. 9A) to allow movement of latch 310 from the blocking position to the default position. Spring 322 for arm 320 may be configured to hold arm 320 in the set position (as shown schematically in FIG. 9C). Component 1000b may comprise a button 320a configured to move arm 320 from the set position to the reset position to allow latch 310 to move from the blocking position to the default position; button 320a may be configured to move through opening 222 of wall 220 of cover 200 as latch 310 moves from the default position to the blocking position. Projection 310b of latch 310 may contact projection 320b of arm 320 to allow movement of latch 310 from the blocking position to the default position (as shown schematically in FIG. 9A). Projection 320b of arm 320 may contact projection 310b of latch 310 to hold latch 310 in the blocking position (as shown schematically in FIG. 9C).

As shown schematically according to an exemplary embodiment in FIG. 9C, latch mechanism 300b may be configured to hold cover 200 in the latched state in response to the force exceeding the predetermined amount. Arm 320 may be configured to move from a set position (as shown schematically in FIG. 9C) to hold cover 200 in the latched state to a reset position (as shown schematically in FIG. 9A) to allow adjustment of cover 200 from the latched state to the unlatched state. Button 320a may be configured to move arm 320 from the set position to the reset position to allow cover 200 to adjust from the latched state to the unlatched state. Button 320a may be configured to move through opening 222 of wall 220 of cover 200 as cover 200 adjusts from the unlatched state to the latched state. Projection 310b of latch 310 may contact projection 320b of arm 320 to allow movement of cover 200 from the unlatched position to the open position (as shown schematically in FIG. 9A). Projection 320b of arm 320 may contact projection 310b of latch 310 to hold cover 200 in the latched state (as shown schematically in FIG. 9C).

According to an exemplary embodiment, latch mechanism 300b may be configured to move from a retracted position (as shown schematically in FIGS. 10A and 11E) to allow cover 200 to move from the closed position to the open position to an extended position (as shown schematically in FIGS. 10D, 10E, 11A and 11B) to prevent cover 200 from moving from the closed position to the open position. Latch mechanism 300b may be configured to move from the retracted position to the extended position in response to a force exceeding a predetermined amount. Latch mechanism 300b may comprise latch 310 configured to move from a default position (as shown schematically in FIGS. 10A and 11E) to a blocking position (as shown schematically in FIGS. 10D, 10E, 11A and 11B) to prevent cover 200 from moving from the closed position to the open position. Latch 310 may be configured to move from the default position to the blocking position in response to an external force F on latch 310. Cover 200 may comprise a wall 210 comprising an opening 212; latch 310 may be configured to move through opening 212 of wall 210 of cover 200 as latch 310 moves from the default position to the blocking position (as shown schematically in FIGS. 10B and 10C). Latch 310 may comprise a bar 310a configured to move through opening 212 of wall 210 of cover 200 as latch 310 moves from the default position to the blocking position (as shown schematically in FIGS. 10B and 10C). Counterweight 314 may be configured to provide mass to move latch 310 from the default position toward the blocking position (as shown schematically in FIGS. 10B and 10C); counterweight 314 may be configured to move from a biased position (as shown schematically in FIG. 10A) to a rotated position (as shown schematically in FIGS. 10C-10F) to prevent cover 200 from moving from the closed position to the open position. Latch mechanism 300b may comprise spring 312 configured to bias latch 310 in the default position (as shown schematically in FIG. 10A). Latch mechanism 300b may be configured to move latch 310 from the blocking position to the default position in response to removal of the force exceeding the predetermined amount. Spring 312 may be configured to move latch 310 from the blocking position to the default position in response to removal of the force exceeding the predetermined amount; spring 312 may be configured to bias latch mechanism 300b in the retracted position; spring 312 may be configured to move latch mechanism 300b from the extended position to the retracted position. Cover 200 may comprise latch mechanism 300b. Force F may comprise an inertial force. Base 100 may comprise an edge or wall 110 (as shown schematically in FIGS. 10D and 10E). Bar 310a of latch 310 may be configured to contact flange 110 of base 100 to prevent cover 200 from moving from the closed position to the open position. When cover 200 is in the closed position, a gap G may be provided between bar 310a of latch 310 and flange 110 of base 100 (as shown schematically in FIG. 10D). Gap G may be provided between bar 310a of latch 310 and flange 110 of base 100 to allow latch 310 to move between the default position and the blocking position regardless of variations due to manufacturing and assembly. Cover 200 may be configured to move from the closed position toward the open position through gap G until bar 310a of latch 310 contacts flange 110 of base 100 as shown schematically in FIG. 10E. Latch mechanism 300b may be configured to hold latch 310 in the blocked position in response to the force exceeding the predetermined amount as shown schematically in FIGS. 10D, 10E and 11A. Arm 320 may be configured to move from a set position to hold latch 310 in the blocking position (as shown schematically in FIGS. 10D-10F and 11A) to a reset position to allow movement of latch 310 from the blocking position to the default position (as shown schematically in FIGS. 11C-11E). Spring 322 for arm 320 may be configured to hold arm 320 in the set position. Button 320a may be configured to move arm 320 from the set position to the reset position to allow latch 310 to move from the blocking position to the default position as shown schematically in FIGS. 11A-11E. An external force, for example from a finger Fi, may move button 320a from the set position to the reset position as shown schematically in FIGS. 11B-11C. Button 320a may be configured to move through opening 222 of wall 220 of cover 200 as blocker 210 moves from the default position to the blocking position as shown schematically in FIGS. 10B-10D. Latch mechanism 300b may be configured to hold cover 200 in the latched state in response to the force exceeding the predetermined amount as shown schematically in FIGS. 10D-10F and 11A. Arm 320 may be configured to move from a set position to hold cover 200 in the latched state (as shown schematically in FIGS. 10D, 10E and 11A) to a reset position to allow adjustment of cover 200 from the latched state to the unlatched state (as shown schematically in FIGS. 11C-11E). Button 320a may be configured to move arm 320 from the set position to the reset position to allow cover 200 to adjust from the latched state to the unlatched state as shown schematically in FIGS. 11B-11E. Button 320a may be configured to move through opening 222 of wall 220 of cover 200 as cover 200 adjusts from the unlatched state to the latched state as shown schematically in FIGS. 11B-11E.

As shown schematically according to an exemplary embodiment in FIGS. 4A-4G, 5A-5D, 6A-6D, 7A-7D, 8A, 8B, 9A-9C, 10A-10F and 11A-11E, a component for a vehicle interior may comprise a base comprising a bin; a cover configured to move from a closed position to cover the bin to an open position to uncover the bin; and a latch mechanism configured to move from a retracted position to allow the cover to move from the closed position to the open position to an extended position to prevent the cover from moving from the closed position to the open position. See e.g. FIGS. 4B-4E, 5B-5D, 6A-6D, 7A-7D, 9A-9C and 10A-10E. The latch mechanism may be configured to move from the retracted position to the extended position in response to a force exceeding a predetermined amount. The latch mechanism may comprise a latch configured to move from a default position to a blocking position to prevent the cover from moving from the closed position to the open position. The latch may be configured to extend from the cover when in the blocking position. The cover may comprise a wall comprising an opening; the latch may be configured to move through the opening of the wall of the cover as the latch moves from the default position to the blocking position. The component may further comprise a counterweight configured to provide mass to move the latch from the default position toward the blocking position. The latch mechanism may comprise a spring configured to (a) bias the latch in the default position and (b) move the latch from the blocking position to the default position in response to removal of the force exceeding the predetermined amount.

As shown schematically according to an exemplary embodiment in FIGS. 8A, 8B, 9A-9C, 10A-10F and 11A-11E, the latch mechanism may be configured to hold the latch in the blocking position in response to the force exceeding the predetermined amount. The latch mechanism may comprise an arm configured to move from (a) a set position to hold the latch in the blocking position to (b) a reset position to allow movement of the latch from the blocking position to the default position. The latch mechanism may comprise a spring for the arm configured to hold the arm in the set position. The component may further comprise a button configured to move the arm from the set position to the reset position to allow the latch to move from the blocking position to the default position. The cover may comprise a wall comprising an opening; the button may be configured to move through the opening of the wall of the cover as the latch moves from the default position to the blocking position. The latch mechanism may comprise a counterweight configured to move from a biased position to a rotated position to prevent the cover from moving from the closed position to the open position. The latch mechanism may comprise a spring configured to bias the latch mechanism in the retracted position. The latch mechanism may comprise a spring configured to move the latch mechanism from the extended position to the retracted position. The cover may comprise the latch mechanism. The force may comprise an inertia force.

As shown schematically according to an exemplary embodiment in FIGS. 4A-4G, 5A-5D, 6A-6D, 7A-7D, 8A, 8B, 9A-9C, 10A-10F and 11A-11E, a component for a vehicle interior may comprise a base comprising a bin; a cover configured to move from a closed position to cover the bin to an open position to uncover the bin; and a latch mechanism configured to move from a retracted position to allow the cover to move from the closed position to the open position to an extended position to prevent the cover from moving from the closed position to the open position. The cover may be configured for adjustment from (1) an unlatched state with the cover in the closed position and the latch mechanism in the retracted position to (2) a transition state with the latch mechanism in the extended position to (3) a latched state with the cover in the closed position and the latch mechanism in the extended position. The component may comprise a gap between the latch mechanism and the base in the transition state. The cover may be configured to move through the gap to contact the base in the latched state. The latch mechanism may comprise a latch configured to move from a default position to a blocking position to adjust the cover from the unlatched state to the latched state. The cover may comprise a wall comprising an opening; the latch may be configured to move through the opening of the wall of the cover as the latch moves from the default position to the blocking position. The latch may be configured to form a generally continuous surface with the wall of the cover when the latch is in the default position. See e.g. FIGS. 4B-4E, 5B-5D, 6A-6D, 7A-7D, 9A-9C and 10A-10E. The component may comprise a counterweight configured to provide mass to move the latch from the default position toward the blocking position. See e.g. FIGS. 4B-4E, 6A-6D, 7A-7D, 9A-9C and 10A-10E. The latch mechanism may comprise a spring configured to bias the latch in the default position. See e.g. FIGS. 4B, 4G, 5B, 6A, 7A, 9A, 10A and 11E. The latch mechanism may be configured to move the latch from the blocking position to the default position in response to removal of the force exceeding the predetermined amount. See e.g. FIGS. 4E-4G.

As shown schematically according to an exemplary embodiment in FIGS. 8A, 8B, 9A-9C, 10A-10F and 11A-11E, the latch mechanism may be configured to hold the cover in the transition state in response to the force exceeding the predetermined amount. The latch mechanism may comprise an arm configured to move from (a) a set position to hold the cover in the transition state to (b) a reset position to allow adjustment of the cover from the transition state to the unlatched state. See e.g. FIGS. 11A-11E. The latch mechanism may comprise a spring for the arm configured to hold the arm in the set position. The component may comprise a button configured to move the arm from the set position to the reset position to allow the cover to adjust from the transition state to the unlatched state. See e.g. FIGS. 11A-11E. The cover may comprise a wall comprising an opening; the button may be configured to move through the opening of the wall of the cover as the cover adjusts from the unlatched state to the latched state. See e.g. FIGS. 10A-10F.

As shown schematically according to an exemplary embodiment in FIGS. 4A through 4G, 5A-5D, 6A-6D, 7A-7D, 8A, 8B, 9A-9C, 10A-10F and 11A-11E, a vehicle interior component configured to provide for a latched state when actuated by an inertia force may comprise a base; a cover configured to move to a closed position relative to the base; a latch mechanism configured to retain the cover in the closed position relative to the base; and a spring mechanism configured to engage the latch mechanism. The latch mechanism may be configured to move into the latched state upon application of the inertia force to move a counterweight. See e.g. FIGS. 4B-4E, 5B-5D, 6A-6D, 7A-7D, 9A-9C and 10A-10E. The cover may comprise the latch mechanism. The cover may be configured to be retained in the closed position when the latch mechanism is in the latched state. The counterweight may be configured to be moved by the inertia force to actuate the latch mechanism into the latched state. The spring mechanism may be configured to maintain the latch mechanism in the unlatched state. See e.g. FIGS. 4B, 4G, 5B, 6A, 7A, 9A, 10A and 11E. The latch mechanism may be configured to move into the latched state against a spring force provided by the spring mechanism. The latch mechanism may be configured to rotate into the latched state upon application of the inertia force to lift the counterweight. The latch mechanism may be configured to rotate into the latched state against a spring force provided by the spring mechanism. The latch mechanism may be configured to retain the cover in the closed position relative to the base when in the latched state. The latch mechanism may comprise a bar configured to engage the base in the latched state. The bar of the latch mechanism may be configured to rotate into engagement with the base in the latched state. The bar of the latch mechanism may be configured to provide a gap with the base in the latched state. The gap may be configured to be closed to prevent the cover from moving to an open position when the latch mechanism is in the latched state. The spring mechanism may comprise a wire spring. The spring mechanism may comprise a torsion spring.

As shown schematically according to an exemplary embodiment in FIGS. 8A, 8B, 9A-9C, 10A-10F and 11A-

11E, the component may further comprise an arm mechanism configured to reset the latch mechanism from the latched state to the unlatched state. The arm mechanism may comprise a button configured to be actuated to rotate the arm mechanism to disengage the latch mechanism from the latched state. See e.g. FIGS. 11A-11E. The arm mechanism may comprise the spring mechanism. The spring mechanism may comprise a torsion spring. The arm mechanism may comprise an extension configured to engage the latch mechanism. The extension of the arm mechanism may be configured to retain the latch mechanism in the latched state. See e.g. FIGS. 9C, 10F and 11A. The arm mechanism may be configured to release the latch mechanism from the latched state by disengagement of the extension from the latch mechanism. The arm mechanism may be configured to release the latch mechanism from the latched state by disengagement of the extension from the latch mechanism by actuation of the button of the arm mechanism. The arm mechanism may be rotated by actuation of the button. The extension of the arm mechanism may be rotated into disengagement with the latch mechanism by actuation of the button. See e.g. FIGS. 11A-11E. The extension of the arm mechanism may be rotated into engagement with the latch mechanism by movement of the counterweight by the inertia force. The spring mechanism of the arm mechanism may be actuated by actuation of the button. The spring mechanism of the arm mechanism may be actuated by movement of the counterweight of the latch mechanism as the latch mechanism is rotated to the latched state. The button of the arm mechanism may comprise a projection. The latch mechanism may be actuated when the inertia force exceeds a threshold value. The inertia force may be provided by an impact event. The base may comprise a bin and the cover may comprise a door configured to cover the bin. The latch mechanism may comprise a concealed latch mechanism. The cover may comprise a wall and the latch mechanism may be concealed by the wall.

As shown schematically according to an exemplary embodiment in FIGS. 4A-4G, 5A-5D, 6A-6D, 7A-7D, 8A, 8B, 9A-9C, 10A-10F and 11A-11E, a component for a vehicle interior may comprising a base comprising a bin; and a cover comprising a latch mechanism. The cover may be configured to conceal the latch mechanism in a concealed position. The latch mechanism may be configured to extend from the cover to provide an engaged position. The cover may be configured to move from a closed position to an open position when the latch mechanism is in the concealed position. The cover may be configured to be retained by the latch mechanism in the engaged position. The latch mechanism may comprise a spring mechanism and a counterweight mechanism. The latch mechanism may be configured to be actuated to the engaged position by an inertia force acting upon the counterweight mechanism. The spring mechanism may comprise at least one of (a) a spring; (b) a wire; (c) a wire spring. The latch mechanism may be configured to be actuated to the engaged position when the counterweight mechanism is moved to an engaged position; the latch mechanism may be configured to be actuated to the disengaged position when the counterweight mechanism is moved to a disengaged position.

As shown schematically according to an exemplary embodiment in FIGS. 8A, 8B, 9A-9C, 10A-10F and 11A-11E, the latch mechanism may comprise an arm mechanism configured to actuate the spring mechanism for the concealed position. The arm mechanism may comprise at least one of (a) a projection; (b) a manually actuated button. The arm mechanism may comprise a spring and an arm. The cover may comprise a wall and the arm mechanism may comprise a projection configured to extend through the wall.

Exemplary Embodiments—Operation

As shown schematically according to an exemplary embodiment in FIGS. 1D-1F, 2D-2E, 4A-4G, 9A-9C and 10A-10F, an interior component for a vehicle may be configured to be actuated by an inertia force (such as from an impact event affecting the vehicle). Compare FIGS. 2A-2C (component without inertia latch mechanism opening under inertia force). As shown schematically, the component may comprise a cover 200 (shown as an armrest AR) configured to move relative to a base B/100 between a closed position and an open position and a latch mechanism 300 configured to provide an unlatched state for the cover and a latched state for the cover. See e.g. FIGS. 1D-1F, 4A-4G, 9A-9C and 10A-10F. As shown schematically, the latch mechanism may be configured to provide the latched state when actuated by the inertia force to retain the cover in the closed position relative to the base; the latch mechanism may comprise an inertia latch mechanism comprising a counterweight 314; the counterweight may be configured to be moved by the inertia force such as from an impact event affecting the vehicle. See e.g. FIGS. 1D-1F, 2E, 4A-4G, 9A-9C and 10A-10F. As shown schematically, the counterweight may be configured to maintain the latch mechanism in an unlatched state; the latch mechanism may be configured to move (e.g. rotate, etc.) into the latched state upon application of the inertia force to lift the counterweight; the counterweight may be configured to be lifted by the inertia force to actuate the latch mechanism into the latched state. See e.g. FIGS. 4A-4G, 9A-9C and 10A-10F. As shown schematically, a spring mechanism (shown as comprising a spring 312 and/or spring 322) may be configured to maintain the latch mechanism in an unlatched state; the latch mechanism may be configured to move into the latched state against a spring force provided by the spring mechanism. See e.g. FIGS. 4A-4G and 9A-9C. As shown schematically, the latch mechanism may be configured to retain the cover in a closed position relative to the base when in the latched state; the latch mechanism may comprise a projection configured to engage the base; a projection of the latch mechanism may be configured to rotate into engagement with the base in the latched state. See e.g. FIGS. 2E, 4A-4G, 9A-9C and 10A-10F. As shown schematically, the projection of the latch mechanism may be configured to provide a gap G with the base when in the latched state (e.g. to provide a tolerance/range to facilitate engagement/fit notwithstanding variations in size and form as may occur in supply of components, manufacturing, in use overtime, etc.); the gap may be configured to be closed to prevent the cover from moving to an open position when the latch mechanism is in the latched state. See e.g. FIGS. 4A-4G and 6A-6C.

As shown schematically according to an exemplary embodiment in FIGS. 1D-1F, 9A-9C, 10A-10F and 11A-11E, an interior component for a vehicle may be configured to be actuated by an inertia force such as from an impact event and to be actuated by a force applied by an occupant of the vehicle. See also FIGS. 2D-2E. The component may comprise a cover 200 configured to move relative to a base 100 between a closed position and an open position and a latch mechanism 300 configured to provide an unlatched state for the cover and a latched state for the cover and an arm mechanism 318 comprising an arm 320 configured to provide a projection 320a for actuation by the occupant. See e.g. FIGS. 9A-9C, 10A-10F and 11A-11E. As shown schematically, the latch mechanism may be configured to provide the latched state when actuated by the inertia force to retain the cover in the closed position relative to the base. See e.g. FIGS. 9A-9C and 10A-10F. As shown schematically, the arm mechanism may be configured to reset the latch mechanism to the unlatched state when actuated at the projection by occupant so that the cover can be moved to the open position relative to the base. See e.g. FIGS. 11A-11E. According to an exemplary embodiment as shown schematically, the projection may be configured to be actuated to rotate the arm mechanism to disengage the latch mechanism from the latched state. See e.g. FIGS. 11B-11C. As shown schematically, the arm mechanism may comprise a spring mechanism shown as comprising a spring 322 (e.g. torsion spring, etc.); the arm mechanism may comprise an extension 320*b* configured to engage the latch mechanism (e.g. configured to retain the latch mechanism at extension 310*b* in the latched state). See e.g. FIGS. 9A-9C and 11A. As shown schematically, the arm mechanism may be configured to release the latch mechanism from the latched state by disengagement of the extension from the latch mechanism (e.g. by disengagement of an extension/projection 310*b* of the latch mechanism from an extension/projection 320*b* of the arm mechanism). See e.g. FIGS. 11A-11E. As shown schematically, the arm mechanism may be rotated by actuation of the projection; the extension of the arm mechanism may be rotated into disengagement with the latch mechanism by actuation of the projection; the extension of the arm mechanism may be rotated into engagement with the latch mechanism by movement of the counterweight by the inertia force. See e.g. FIGS. 1D-1F, 9A-9C, 10A-10F and 11A-11E. The spring mechanism of the arm mechanism may be actuated by actuation of the projection; the spring mechanism of the arm mechanism may be actuated by movement of the counterweight of the latch mechanism as the latch mechanism may be rotated to the latched state. See e.g. FIGS. 9B-9C and 10B-10F.

As shown schematically, the latch mechanism may be actuated when the inertia force exceeds a threshold value (e.g. as designed/configured by the counterweight/mass and arrangement of moving/engaging elements, moment arm, spring forces, etc.); the inertia force may be provided by an impact event. See also FIGS. 2D-2E.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A vehicle interior component configured to be actuated by an inertia force comprising:
   (a) a base;
   (b) a cover configured to move relative to the base between a closed position and an open position; and
   (c) a latch mechanism configured to provide an unlatched state for the cover and a latched state for the cover;
   wherein the latch mechanism is configured to provide the latched state when actuated by the inertia force;
   wherein the latch mechanism is configured to hold the cover in the unlatched state;
   wherein the latch mechanism is configured to move through an opening of a wall of the cover to provide the latched state for the cover.

2. The component of claim 1 wherein the cover comprises the latch mechanism.

3. The component of claim 1 wherein the latch mechanism is configured to extend from the cover in the latched state.

4. The component of claim 1 wherein the latch mechanism is configured to form a generally continuous surface with the wall of the cover in the unlatched state.

5. The component of claim 1 wherein the latch mechanism comprises an inertia latch mechanism comprising a counterweight and configured to provide the latched state for the cover in response to an event providing a force on the counterweight so that the cover remains in the closed position in the event; wherein the force on the counterweight comprises an inertia force caused by the event.

6. The component of claim 1 wherein the latch mechanism is configured (a) to rotate relative to the cover and (b) to rotate with the cover relative to the base to engage the base.

7. The component of claim 1 wherein the latch mechanism comprises a spring configured to hold the cover in the unlatched state.

8. The component of claim 1 comprising at least one of (a) a console; (b) a center console; (c) a floor console; (d) an armrest.

9. A component for an interior of a vehicle configured to be actuated by an inertia force comprising:
   (a) a base;
   (b) a cover configured to move relative to the base between a closed position and an open position; and
   (c) a latch mechanism configured to provide an unlatched state for the cover and a latched state for the cover;
   wherein the latch mechanism is configured to provide the latched state when actuated by the inertia force to retain the cover in the closed position relative to the base;
   wherein the latch mechanism is configured to provide a retracted position to maintain the cover in the unlatched state;
   wherein the latch mechanism comprises a counterweight configured (1) to maintain the latch mechanism in the unlatched state for the cover and (2) to be moved by the inertia force such as from an event affecting the vehicle to provide the latched state for the cover.

10. The component of claim 9 wherein the latch mechanism is configured to move to an extended position when actuated by the inertia force.

11. The component of claim 10 wherein the cover is configured for movement from (a) the unlatched state with the cover in the closed position and the latch mechanism in the retracted position to (b) a transition state with the latch mechanism in the extended position to (c) the latched state with the cover in the closed position and the latch mechanism in the extended position.

12. The component of claim 11 comprising a gap between the latch mechanism and the base in the transition state; wherein the cover is configured to move through the gap to contact the base in the latched state.

13. The component of claim 9 wherein the latch mechanism comprises a spring; wherein the spring is configured to act on the counterweight to provide the unlatched state for the cover and the counterweight is configured to act on the spring in response to the event providing the inertia force to provide the latched state for the cover.

14. A vehicle interior component configured to be actuated by an inertia force comprising:
   (a) a base;
   (b) a cover configured to move relative to the base between a closed position and an open position; and
   (c) a latch mechanism configured to provide an unlatched state for the cover and a latched state for the cover;
   wherein the latch mechanism is configured to change state of the cover from the unlatched state to the latched state when actuated by the inertia force;
   wherein the latch mechanism is configured (1) to provide a gap with the base in the latched state for the cover and (2) to close the gap to prevent the cover from moving to the open position when in the latched state for the cover.

15. The component of claim 14 wherein the latch mechanism comprises a spring configured to hold the cover in the unlatched state.

16. The component of claim 14 wherein the latch mechanism comprises a member configured to move into engagement with the base in the latched state when actuated by the inertia force.

17. The component of claim 16 wherein the member of the latch mechanism comprises a bar; wherein the bar is configured to engage a flange of the base in the latched state.

18. The component of claim 16 wherein the member of the latch mechanism is configured to provide the gap with the base in the latched state.

19. The component of claim 18 wherein the gap is configured to be closed to prevent the cover from moving to the open position by engagement of the member with the base.

20. The component of claim 16 further comprising (a) a counterweight configured to provide mass to move the member toward engagement with the base and (b) a spring mechanism configured to (1) bias the member toward the unlatched state and/or (2) move the member in response to removal of the inertia force.

* * * * *